(12) United States Patent
Lewis et al.

(10) Patent No.: US 12,116,321 B2
(45) Date of Patent: Oct. 15, 2024

(54) METHODS OF MAKING HONEYCOMB BODIES HAVING INORGANIC FILTRATION DEPOSITS

(71) Applicant: CORNING INCORPORATED, Corning, NY (US)

(72) Inventors: Mark Alan Lewis, Horseheads, NY (US); Cai Liu, Suzhou (CN); Dale Robert Powers, Painted Post, NY (US); Todd Parrish St Clair, Painted Post, NY (US); Jianguo Wang, Horseheads, NY (US); Huiqing Wu, Shanghai (CN); Fei Xia, New York, NY (US); Xinfeng Xing, Shanghai (CN); Danhong Zhong, Elmira, NY (US)

(73) Assignee: Corning Incorporated, Corning, NY (US)

( * ) Notice: Subject to any disclaimer, the term of this patent is extended or adjusted under 35 U.S.C. 154(b) by 743 days.

(21) Appl. No.: 17/272,232

(22) PCT Filed: Aug. 30, 2019

(86) PCT No.: PCT/US2019/049198
§ 371 (c)(1),
(2) Date: Feb. 26, 2021

(87) PCT Pub. No.: WO2020/047499
PCT Pub. Date: Mar. 5, 2020

(65) Prior Publication Data
US 2021/0179501 A1     Jun. 17, 2021

Related U.S. Application Data

(60) Provisional application No. 62/726,192, filed on Aug. 31, 2018, provisional application No. 62/856,632, filed on Jun. 3, 2019.

(30) Foreign Application Priority Data

Sep. 3, 2018 (WO) ................ PCT/CN2018/103807

(51) Int. Cl.
*C04B 38/00* (2006.01)
*B01D 39/20* (2006.01)
(Continued)

(52) U.S. Cl.
CPC ...... *C04B 38/0006* (2013.01); *B01D 39/2034* (2013.01); *B01D 39/2079* (2013.01);
(Continued)

(58) Field of Classification Search
CPC ............ C04B 38/0006; C04B 38/0096; C04B 41/4543; C04B 26/10; C04B 35/195;
(Continued)

(56) References Cited

U.S. PATENT DOCUMENTS 6,840,976 B2   1/2005   Vance et al.
6,890,616 B2   5/2005   Suwabe et al.
(Continued)

FOREIGN PATENT DOCUMENTS

CN   1365298 A   8/2002
CN   1424493 A   6/2003
(Continued)

OTHER PUBLICATIONS

Hanft et al., "An overview of the aerosol deposition method process: fundamentals and new trends in materials applications", J. Ceram. Sci. Tech., vol. 6, No. 3, pp. 147-182.
(Continued)

*Primary Examiner* — Michael G Miller
(74) *Attorney, Agent, or Firm* — Matthew J. Mason

(57) ABSTRACT

A method for applying a surface treatment to a plugged honeycomb body comprising porous wall includes: mixing particles of an inorganic material with a liquid vehicle and a binder material to form a liquid-particulate-binder stream; mixing the liquid-particulate-binder stream with an atomizing gas, directing the liquid-particulate-binder stream into an atomizing nozzle thereby atomizing the particles into liquid-particulate-binder droplets comprised of the liquid vehicle, the binder material, and the particles; conveying the droplets toward the plugged honeycomb body by a gaseous carrier stream, wherein the gaseous carrier stream comprises a
(Continued)

carrier gas and the atomizing gas; evaporating substantially all of the liquid vehicle from the droplets to form agglomerates comprised of the particles and the binder material; depositing the agglomerates onto the porous walls of the plugged honeycomb body; wherein the deposited agglomerates are disposed on, or in, or both on and in, the porous walls.

22 Claims, 11 Drawing Sheets

(51) Int. Cl.

| | |
|---|---|
| B01D 46/00 | (2022.01) |
| B01D 46/24 | (2006.01) |
| B05B 7/14 | (2006.01) |
| B05B 7/16 | (2006.01) |
| B82Y 30/00 | (2011.01) |
| B82Y 40/00 | (2011.01) |
| C04B 26/10 | (2006.01) |
| C04B 35/195 | (2006.01) |
| C04B 41/00 | (2006.01) |
| C04B 41/45 | (2006.01) |
| C04B 41/50 | (2006.01) |
| C04B 41/87 | (2006.01) |
| C04B 111/00 | (2006.01) |

(52) U.S. Cl.
CPC ..... *B01D 46/0001* (2013.01); *B01D 46/2418* (2013.01); *B05B 7/14* (2013.01); *B05B 7/1613* (2013.01); *C04B 26/10* (2013.01); *C04B 35/195* (2013.01); *C04B 38/0019* (2013.01); *C04B 38/0096* (2013.01); *C04B 41/009* (2013.01); *C04B 41/4543* (2013.01); *C04B 41/5031* (2013.01); *C04B 41/87* (2013.01); *B01D 2239/0407* (2013.01); *B01D 2239/0478* (2013.01); *B82Y 30/00* (2013.01); *B82Y 40/00* (2013.01); *C04B 2111/00793* (2013.01); *C04B 2111/0081* (2013.01)

(58) Field of Classification Search
CPC .............. C04B 38/0019; C04B 41/009; C04B 41/5031; C04B 41/87; C04B 2111/00793; C04B 2111/0081; C04B 35/00; C04B 41/4539; C04B 41/457; B05B 7/14; B05B 7/1613; B01D 39/2034; B01D 39/2079; B01D 46/0001; B01D 46/2418; B01D 2239/0407; B01D 2239/0478; B82Y 30/00; B82Y 40/00
See application file for complete search history.

(56) References Cited

U.S. PATENT DOCUMENTS

| | | | |
|---|---|---|---|
| 7,520,918 B2 | 4/2009 | Zoeller, III | |
| 7,704,296 B2 | 4/2010 | Merkel | |
| 7,767,256 B2 | 8/2010 | Gu et al. | |
| 8,012,439 B2 | 9/2011 | Arnold et al. | |
| 8,298,311 B2 | 10/2012 | Chen et al. | |
| 8,475,557 B2 | 7/2013 | Boger et al. | |
| 8,495,968 B2 | 7/2013 | Tsuji et al. | |
| 8,534,221 B2 | 9/2013 | Tsuji et al. | |
| 8,632,852 B2 | 1/2014 | Tsuji et al. | |
| 8,894,895 B2 | 11/2014 | Fredholm et al. | |
| 8,959,773 B2 | 2/2015 | Fekety et al. | |
| 9,040,003 B2 | 5/2015 | Andersen et al. | |
| 9,255,036 B2 | 2/2016 | Drury et al. | |
| 9,321,694 B2 | 4/2016 | Pyzik et al. | |
| 9,352,277 B2 | 5/2016 | Sutton et al. | |
| 9,523,623 B2 | 12/2016 | Blanchard et al. | |
| 9,656,421 B2 | 5/2017 | Chaumonnot et al. | |
| 10,752,997 B2 | 8/2020 | Jiang | |
| 11,535,941 B2 | 12/2022 | Shinoda et al. | |
| 2003/0024219 A1 | 2/2003 | Harada et al. | |
| 2003/0167755 A1 | 9/2003 | Nakatani et al. | |
| 2004/0176246 A1 | 9/2004 | Shirk et al. | |
| 2005/0180898 A1 | 8/2005 | Yamada | |
| 2010/0126133 A1 | 5/2010 | Fekety et al. | |
| 2010/0158774 A1 | 6/2010 | Andy et al. | |
| 2012/0070346 A1 | 3/2012 | Mizutani et al. | |
| 2014/0248464 A1 | 9/2014 | Soga | |
| 2014/0272276 A1* | 9/2014 | Drury | C04B 41/483 |
| | | | 428/116 |
| 2015/0017075 A1 | 1/2015 | Jinbo et al. | |
| 2016/0272547 A1 | 9/2016 | Kikuchi et al. | |
| 2018/0311621 A1 | 11/2018 | Chen et al. | |
| 2018/0361299 A1 | 12/2018 | Ingram-Ogunwumi et al. | |
| 2019/0048771 A1 | 2/2019 | Liu et al. | |
| 2019/0161414 A1* | 5/2019 | Giménez | C04B 35/00 |
| 2020/0353401 A1 | 11/2020 | Beall et al. | |
| 2020/0398263 A1 | 12/2020 | Usui et al. | |

FOREIGN PATENT DOCUMENTS

| | | |
|---|---|---|
| CN | 1464936 A | 12/2003 |
| CN | 1512972 A | 7/2004 |
| CN | 1646204 A | 7/2005 |
| CN | 1984854 A | 6/2007 |
| CN | 101311501 A | 11/2008 |
| CN | 101558024 A | 10/2009 |
| CN | 101563170 A | 10/2009 |
| CN | 101679135 A | 3/2010 |
| CN | 101970377 A | 2/2011 |
| CN | 102413906 A | 4/2012 |
| CN | 102762279 A | 10/2012 |
| CN | 103080047 A | 5/2013 |
| CN | 103270002 A | 8/2013 |
| CN | 103459012 A | 12/2013 |
| CN | 103796758 A | 5/2014 |
| CN | 103889928 A | 6/2014 |
| CN | 104768643 A | 7/2015 |
| CN | 104801114 A | 7/2015 |
| CN | 105408731 A | 3/2016 |
| CN | 105503232 A | 4/2016 |
| CN | 105793212 A | 7/2016 |
| CN | 108290102 A | 7/2018 |
| CN | 108367225 A | 8/2018 |
| EP | 1775021 A1 | 4/2007 |
| EP | 1775022 A1 | 4/2007 |
| EP | 2158956 A1 | 3/2010 |
| JP | 07-330456 A | 12/1995 |
| JP | 2010-529343 A | 8/2010 |
| JP | 2012-509764 A | 4/2012 |
| JP | 2013-542902 A | 11/2013 |
| JP | 2014-117663 A | 6/2014 |
| JP | 2015-034322 A | 2/2015 |
| WO | 2004/007499 A1 | 1/2004 |
| WO | 2008/136232 A1 | 11/2008 |
| WO | 2009/101683 A1 | 8/2009 |
| WO | 2013/145323 A1 | 10/2013 |
| WO | 2015/168530 A1 | 11/2015 |
| WO | 2017/075328 A1 | 5/2017 |
| WO | 2020/047503 A2 | 3/2020 |
| WO | 2020/047506 A1 | 3/2020 |

OTHER PUBLICATIONS

Konstandopoulos et al., "Microstructural Properties of Soot Deposit in Diesel Particulate Traps", in SAE World Congress & Exhibition, 2002, 11 pages.
Tandon et al., "Measurement and prediction of filtration efficiency evolution of soot loaded diesel particulate filters", Chemical Engineering Science vol. 65, Issue 16, Aug. 15, 2010, pp. 4751-4760.
C. U. Ingemar, et al., "Dealuminated mordenites as catalyst in the oxidation and decomposition of nitric oxide and in the decomposition of nitrogen dioxide: characterization and activities", Catalysis Today, Jan. 1989, pp. 155-172.

(56) References Cited

OTHER PUBLICATIONS

R. M. Heck, et al., Catalytic Air Pollution Control, Commercial Technology, John Wiley & Sons 3rd Edition, 2009.
Chinese Patent Application No. 201980072128.X, Office Action, dated Apr. 28, 2022, 19 pages, (10 pages of English Translation and 9 pages of Original Copy); Chinese Patent Office.
Japanese Patent Application No. 2021-511533, Office Action, dated Aug. 8, 2023, 12 pages (6 pages of English Translation and 6 pages of Original Copy); Japanese Patent Office.

* cited by examiner

METHODS OF MAKING HONEYCOMB BODIES HAVING INORGANIC FILTRATION DEPOSITS

This is a national stage application under 35 U.S.C. § 371 of International Application No. PCT/US2019/049198, filed Aug. 30, 2019, which claims the benefit of priority under 35 U.S.C. § 119 of U.S. Provisional Application Nos. 62/726,192 filed on Aug. 31, 2018 and 62/856,632 filed on Jun. 3, 2019, as well as International Application No. PCT/CN2018/103807 filed on Sep. 3, 2018, the contents of which are incorporated herein by reference in their entireties.

BACKGROUND

Field

The present specification relates to methods of making porous bodies, such as porous ceramic honeycomb bodies, which comprise inorganic deposits, the deposits comprised of an inorganic filtration material.

Technical Background

Wall flow filters are employed to remove particulates from fluid exhaust streams, such as from combustion engine exhaust. Examples include diesel particulate filters used to remove particulates from diesel engine exhaust gases and gasoline particulate filters (GPF) used to remove particulates from gasoline engine exhaust gases. Exhaust gas to be filtered enters inlet cells and passes through the cell walls to exit the filter via outlet channels, with the particulates being trapped on or within the inlet cell walls as the gas traverses and then exits the filter.

SUMMARY

Aspects of the disclosure pertain to porous bodies and methods for their manufacture and use.

In one aspect, a method is disclosed herein for applying a surface treatment to a plugged honeycomb body comprising porous walls which comprises: mixing particles of an inorganic material with a liquid vehicle and a binder material to form a liquid-particulate-binder stream; mixing the liquid-particulate-binder stream with an atomizing gas, directing the liquid-particulate-binder stream into an atomizing nozzle thereby atomizing the particles into liquid-particulate-binder droplets comprised of the liquid vehicle, the binder material, and the particles; conveying the droplets toward the plugged honeycomb body by a gaseous carrier stream, wherein the gaseous carrier stream comprises a carrier gas and the atomizing gas; evaporating substantially all of the liquid vehicle from the droplets to form agglomerates comprised of the particles and the binder material; depositing the agglomerates onto the porous walls of the plugged honeycomb body; wherein the deposited agglomerates are disposed on, or in, or both on and in, the porous walls. In one or more embodiments, at least a portion of the carrier gas contacts the atomizing nozzle.

In another aspect, a method is disclosed herein for forming a honeycomb body which comprises: supplying a suspension to a nozzle that is in fluid communication with a duct comprising an evaporation section, the suspension comprising an inorganic material, a binder material, and a liquid vehicle; supplying a carrier gas to the duct; contacting the nozzle with the carrier gas; in the evaporation section, evaporating at least a portion of the liquid vehicle thereby forming agglomerates of the inorganic material; depositing the agglomerates on walls of the honeycomb body; and binding the inorganic material to the honeycomb body to form a porous inorganic material.

A further aspect is: a method for applying an inorganic material to a plugged honeycomb body comprising porous walls, the method comprising: supplying a suspension comprising particles of the inorganic material and a liquid vehicle to a nozzle that is in fluid communication with a duct comprising an evaporation section; atomizing the suspension with an atomizing gas to form droplets; supplying a heated carrier gas; intermixing a gaseous carrier stream including the heated carrier gas with the droplets inside a chamber of the duct to form a gas-liquid-particulate-binder mixture; evaporating at least a portion of the liquid vehicle from the droplets to form agglomerates of the particles, the agglomerates being interspersed in the gaseous carrier stream; passing the agglomerates and the gaseous carrier stream into the plugged honeycomb body in fluid communication with the duct such that the gaseous carrier stream passes through porous walls of the plugged honeycomb body, and the walls of the plugged honeycomb body trap the agglomerates, wherein the agglomerates are deposited on or in the walls of the honeycomb body.

Additional features and advantages will be set forth in the detailed description, which follows, and in part will be readily apparent to those skilled in the art from that description or recognized by practicing the embodiments described herein, comprising the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
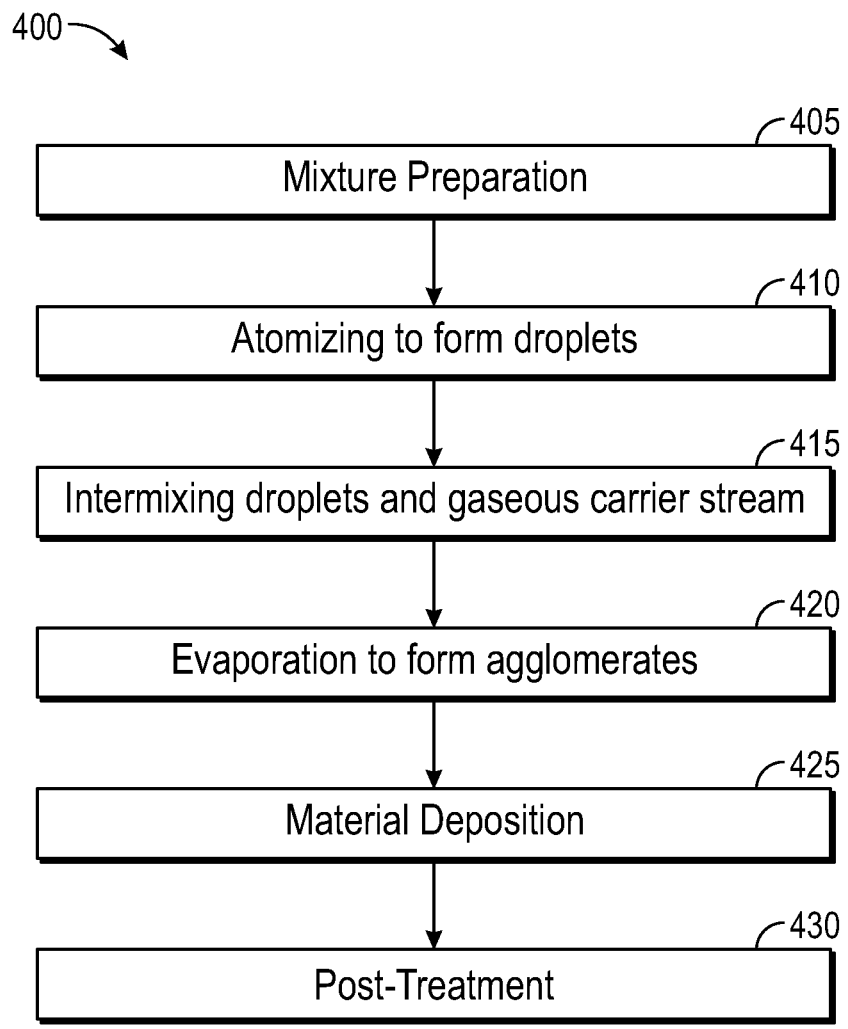
FIG. 1 is a flowchart depicting an exemplary embodiment of a process of making material which may be deposited onto porous body thereby creating inorganic material deposits, which are preferably porous deposits, and which can be in the form of discrete regions of filtration material, or which in some portions or some embodiments may be in the form of a porous inorganic layer according to embodiments disclosed herein.

Reference will now be made in detail to embodiments of methods for forming honeycomb bodies comprising a porous honeycomb body comprising inorganic deposits (or "filtration deposits") on, or in, or both on and in, the porous ceramic walls of the honeycomb body matrix, embodiments of which are illustrated in the accompanying drawings. Filtration deposits comprise material that was deposited into the honeycomb body, as well as compounds that may be formed, for example by heating, from one or materials that were originally deposited. For example, a binder material may be transformed by heating into an organic component which is eventually burned off or volatilized, while an inorganic component (such as silica) remains contained within the honeycomb filter body. Whenever possible, the same reference numerals will be used throughout the drawings to refer to the same or like parts.

Definitions

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

A "honeycomb body," as referred to herein, comprises a ceramic honeycomb structure of a matrix of intersecting walls that form cells which define channels. The ceramic honeycomb structure can be formed, extruded, or molded from a plasticized ceramic or ceramic-forming batch mixture or paste. A honeycomb body may comprise an outer peripheral wall, or skin, which was either extruded along with the matrix of walls or applied after the extrusion of the matrix. For example, a honeycomb body can be a plugged ceramic honeycomb structure which forms a filter body comprised of cordierite or other suitable ceramic material. A plugged honeycomb body has one or more channels plugged at one, or both ends of the body.

A honeycomb body disclosed herein comprises a ceramic honeycomb structure comprising at least one wall carrying one or more filtration material deposits which is configured to filter particulate matter from a gas stream. The filtration material deposits can be in discrete regions or in some portions or some embodiments can make one or more layers of filtration material at a given location on the wall of the honeycomb body. The filtration material deposits preferably comprise inorganic material, in some embodiments organic material, and in some embodiments both inorganic material and organic material. For example, a honeycomb body may, in one or more embodiments, be formed from cordierite or other porous ceramic material and further comprise inorganic material deposits disposed on or below wall surfaces of the cordierite honeycomb structure.

In some embodiments, the filtration material comprises one or more inorganic materials, such as one or more ceramic or refractory materials.

As used herein, "green" or "green ceramic" are used interchangeably and refer to an unsintered or unfired material, unless otherwise specified.

Methods of Forming Honeycomb Bodies

Aspects of the disclosure pertain to methods of forming porous bodies, such as porous ceramic honeycomb bodies, comprising a material such as a filtration material such as a inorganic material such as a ceramic or refractory material or even a porous ceramic or refractory material. Preferably the filtration material is an aerosol-deposited filtration material. In some preferred embodiments, the filtration material comprises a plurality of inorganic particle agglomerates, wherein the agglomerates are comprised of inorganic, such as ceramic or refractory, material. In some embodiments, the agglomerates are porous, which may allow gas to flow through the agglomerates.

Aerosol deposition enables deposition of filtration material onto the porous ceramic walls, which can be discrete regions as small as a single agglomerate or larger such as a plurality of agglomerates, and in some embodiments is in the form of a porous layer of filtration material, on or in, or both on and in, at least some surfaces of the walls of the ceramic honeycomb body. In certain embodiments, an advantage of the aerosol deposition method according to one or more embodiments is that ceramic honeycomb bodies with enhanced filtration performance can be produced economically, and/or more efficiently.

In certain embodiments, an aerosol deposition process disclosed herein comprises: mixture preparation (e.g., inorganic material, liquid vehicle, and binder), atomizing the mixture with an atomizing gas with a nozzle to form agglomerates, or aggregates, comprised of the inorganic material, the liquid vehicle, and the binder if any, drying the agglomerates or aggregates in the presence of a carrier gas or a gaseous carrier stream, depositing the aggregates or agglomerates onto the honeycomb bodies, and optionally curing the material. In some embodiments, walls of the apparatus can be heated to assist in drying the aggregates or agglomerates.

In various embodiments, the carrier gas can be heated in addition to, or rather than, heating walls of the apparatus, such that liquid vehicle can evaporate from the agglomerates faster, which in turn allows agglomerates to be generated more efficiently. A heated gaseous carrier stream carries both the atomized droplets and the agglomerates created through the apparatus and into the honeycomb body. In some embodiments, atomizing gas is heated, alone or in combination with heating the carrier gas. In some embodiments, co-flowing the aerosolized droplets and/or agglomerates and the gaseous carrier stream in substantially the same direction into a chamber of an apparatus may help to reduce material loss or overspray on walls of the apparatus. Furthermore, a convergent section can be added to the apparatus before the agglomerates enter the ceramic honeycomb body in order to help the gas flow and particle tracking to be more uniform across the apparatus. An inner diameter of the end of the convergent section can be slightly larger than an outer diameter of the ceramic honeycomb body outer diameter in order to reduce or eliminate boundary effects of non-uniform particle deposition.

In an atomizing nozzle, or atomizer, high pressure and/or high speed atomizing gas can be used to break-up the suspension, which contains a mixture of liquid vehicle, binder, and solid particles, into small liquid droplets, for example with average droplet size of 4-6 micrometers. Heating of these liquid droplets and quick evaporation of the liquid vehicle creates porous inorganic agglomerates before depositing on the honeycomb body walls as a porous inorganic feature or structure. In some embodiments more than one nozzle is utilized, even in some cases under the same operating conditions, such that the liquid flow through each nozzle is reduced and droplet sizes can be smaller.

According to one or more embodiments, a process is disclosed herein comprising forming an aerosol with a binder, which is deposited on a honeycomb body to provide a high filtration efficiency material, which may be present in discrete regions and/or in some portions or some embodiments in an inorganic layer, on the honeycomb body to provide a particulate filter. According to one or more embodiments, the performance is >90% filtration efficiency with a <10% pressure drop penalty compared to the bare filter. According to one or more embodiments, as shown in FIG. 1, the process 400 comprises the steps of mixture preparation 405, atomizing to form droplets 410, intermixing droplets and a gaseous carrier stream 415; evaporating liquid vehicle to form agglomerates 420, depositing of material, e.g., agglomerates, on the walls of a wall flow filter 425, and optional post-treatment 430 to, for example, bind the material on, or in, or both on and in, the porous walls of the honeycomb body. Aerosol deposition methods form of agglomerates comprising a binder can provide a high mechanical integrity even without any high temperature curing steps (e.g., heating to temperatures in excess of 1000° C.), and in some embodiments even higher mechanical integrity after a curing step such as a high temperature (e.g., heating to temperatures in excess of 1000° C.) curing step.

Mixture preparation 405. Commercially available inorganic particles can be used as a raw material in a mixture in the formation of an inorganic material for depositing. According to one or more embodiments, the particles are selected from $Al_2O_3$, $SiO_2$, $TiO_2$, $CeO_2$, $ZrO_2$, SiC, MgO and combinations thereof. In one or more embodiments, the mixture is a suspension. The particles may be supplied as a raw material suspended in a liquid vehicle to which a further liquid vehicle is optionally added.

In some embodiments, the liquid vehicle is an alcohol (e.g. ethanol). In other embodiments, the liquid is water. Thus in some embodiments the mixture is aqueous-based; for example, a liquid vehicle of the mixture may be water. In other embodiments, the mixture is organic-based; for example, a liquid vehicle of the suspension may be an alcohol, such as ethanol or methanol or combinations thereof. In one or more embodiments, the liquid vehicle has a vapor pressure that is greater than the vapor pressure of water at the temperature of the gaseous carrier stream. In one or more embodiments, the liquid vehicle consists essentially of a material having a boiling point below the boiling point of water at the temperature of the gaseous carrier stream. In one or more embodiments, the liquid vehicle is an alcohol. In one or more embodiments, the liquid vehicle is methoxyethanol, ethanol, xylene, methanol, ethylacetate, benzene, or mixtures thereof. In one or more embodiments, the liquid vehicle is alcohol. In one or more embodiments, the liquid vehicle consists essentially of water.

In some embodiments, the suspension comprises by weight: 5-20% particles and 80-95% liquid, and all values and subranges therebetween. In an embodiment, the suspension comprises by weight: 11 percent±1% alumina and 89 percent±1% ethanol.

In one or more embodiments, the particles have an average primary particle size in a range of from about 10 nm to 4 about microns, about 20 nm to about 3 microns or from about 50 nm to about 2 microns, or from about 50 nm to about 900 nm or from about 50 nm to about 600 nm. In specific embodiments, the average primary particle size is in a range of from about 100 nm to about 200 nm, for example, 150 nm. The average primary particle size can be determined as a calculated value from the BET surface area of the aerosol particles, which in some embodiments is 10 $m^2/g$ currently.

In one or more embodiments, the primary particles comprise a ceramic particle, such as an oxide particle, for example $Al_2O_3$, $SiO_2$, MgO, $CeO_2$, $ZrO_2$, CaO, $TiO_2$, cordierite, mullite, SiC, aluminum titanate, and mixture thereof.

The mixture is formed using a solvent which is added to dilute the suspension if needed. Decreasing the solids content in the mixture could reduce the aggregate size proportionally if the droplet generated by atomizing has similar size. The solvent should be miscible with suspension mentioned above, and be a solvent for binder and other ingredients.

Binder is optionally added to reinforce the agglomerates and to preferably provide a stickiness or tackiness, and can comprise inorganic binder, to provide mechanical integrity to deposited material. The binder can provide binding strength between particles at elevated temperature (>500° C.). The starting material can be organic. After exposure to high temperature in excess of about 150° C., the organic starting material will decompose or react with moisture and oxygen in the air, and the final deposited material composition could comprise $Al_2O_3$, $SiO_2$, MgO, $CeO_2$, $ZrO_2$, CaO, $TiO_2$, cordierite, mullite, SiC, aluminum titanate, and mixture thereof. One example of a suitable binder is Dowsil™ US-CF-2405 and Dowsil™ US-CF-2403, both available from The Dow Chemical Company. An exemplary binder content is in the range of greater than or equal to 5% by weight to less than of equal to 25% by weight of the particle content. In an embodiment, the binder content is 15 to 20% by weight±1%.

Catalyst can be added to accelerate the cure reaction of binder. An exemplary catalyst used to accelerate the cure reaction of Dowsil™ US-CF-2405 is titanium butoxide. An exemplary catalyst content is 1% by weight of the binder.

Atomizing to form droplets 410. The mixture is atomized into fine droplets by high pressure gas through a nozzle. One example of the nozzle is 1/4J-SS+SU11-SS from Spraying Systems Co. This setup is comprised of a nozzle body along with fluid cap 2050 and air cap 67147. The atomizing gas can contribute to breaking up the liquid-particulate-binder stream into the droplets.

In one or more embodiments, the liquid-particulate-binder droplets are directed into the chamber by a nozzle.

In one or more embodiments, the liquid-particulate-binder droplets are directed into the chamber by a plurality of nozzles. In one or more embodiments, atomizing the plurality of liquid-particulate-binder streams occurs with a plurality of atomizing nozzles. The plurality of nozzles may include 2 or more nozzles, 3 or more, 4 or more, 5 or more, 6 or more, 7 or more, 8 or more, 9 or more, 10 or more, and the like. The plurality of nozzles may be evenly spaced within the chamber. In one or more embodiments, each of the plurality of nozzles is angled toward a center of the apparatus. The angle of the nozzles may be acute, ranging from less than 90° to greater than 10° relative to a side wall of the apparatus, and all values and subranges therebetween, including 20° to 45°.

The pressure of the atomizing gas may be in the range of 20 psi to 150 psi. The pressure of the liquid may be in the range of 1 to 100 psi. The average droplet size according to one or more embodiments may be in the range of from 1 micron to 40 microns, including for example, in a range of greater than or equal to 1 micron to less than or equal to 15 microns; greater than or equal to 2 microns to less than or equal to 8 microns; greater than or equal to 4 microns to less than or equal to 8 microns; and greater than or equal to 4 microns to less than or equal to 6 microns; and all values and subranges therebetween. The droplet size can be adjusted by adjusting the surface tension of the mixture, viscosity of the mixture, density of the mixture, gas flow rate, gas pressure, liquid flow rate, liquid pressure, and nozzle design. In one or more embodiments, the atomizing gas comprises nitrogen. In one or more embodiments, the atomizing gas may consist essentially of an inert gas. In one or more embodiments, the atomizing gas may is predominantly one or more inert gases. In one or more embodiments, the atomizing gas may is predominantly nitrogen gas. In one or more embodiments, the atomizing gas may is predominantly air. In one or more embodiments, the atomizing gas may consist essentially of nitrogen or air. In one or more embodiments, the atomizing gas may be dry. In one or more embodiments, the atomizing gas may comprise essentially no liquid vehicle upon entry to the chamber.

In some embodiments, the suspension flow rate is in the range of 10 to 25 g/minute, including all values and subranges therebetween, including 18 g/min.

In some embodiments, the atomizing gas flow rate nitrogen flow rate is in the range of 2 to 10 $Nm^3$/hr, including all values and subranges therebetween, including 5-6 $Nm^3$/hr.

Suspension flow and corresponding agglomerate size may be controlled by a pressure control system or a flow control system, as appropriate to the apparatus. For a pressure control system, a pressure controller is in communication with a delivery conduit such as tubing or piping and a suspension of primary particles in a liquid is introduced into the delivery conduit, which is then flowed to the nozzle. For a flow control system, an injector pump is provided, which delivers the suspension of primary particles in a liquid to the nozzle. Atomizing gas is typically separately supplied to the nozzle.

In one or more embodiments, the suspension comprises an inorganic material, a liquid vehicle, and preferably a binder, which is supplied to the nozzle as a liquid-particulate-binder stream. That is, particles of an inorganic material can be mixed with a liquid vehicle and a binder material to form a liquid-particulate-binder stream. The liquid-particulate-binder stream is atomized with the atomizing gas into liquid-particulate-binder droplets by the nozzle. In one or more embodiments, the liquid-particulate-binder stream is mixed with the atomizing gas. In one or more embodiments, the liquid-particulate-binder stream is directed into the atomizing nozzle thereby atomizing the particles into liquid-particulate-binder droplets. The liquid-particulate-binder droplets are comprised of the liquid vehicle, the binder material, and the particles.

In one or more embodiments, the liquid-particulate-binder stream mixes with the atomizing gas via the atomizing nozzle. In one or more embodiments, the liquid-particulate-binder stream enters the atomizing nozzle. In one or more embodiments, the mixing of the liquid-particulate-binder stream with the atomizing gas occurs inside the atomizing nozzle. In one or more embodiments, the mixing of the liquid-particulate-binder stream with the atomizing gas occurs outside the atomizing nozzle.

Intermixing droplets and gaseous carrier stream 415. The droplets are conveyed toward the honeycomb body by a gaseous carrier stream. In one or more embodiments, the gaseous carrier stream comprises a carrier gas and the atomizing gas. In one or more embodiments, at least a portion of the carrier gas contacts the atomizing nozzle. In one or more embodiments, substantially all of the liquid vehicle is evaporated from the droplets to form agglomerates comprised of the particles and the binder material.

In one or more embodiments, the gaseous carrier stream is heated prior to being mixed with the droplets. In one or more embodiments, the gaseous carrier stream is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween. Operationally, temperature can be chosen to at least evaporate solvent of the mixture or suspension so long as the final temperature is above the dew point. As non-limiting example, ethanol can be evaporated at a low temperature. Without being held to theory, it is believed that an advantage of a higher temperature is that the droplets evaporate faster and when the liquid is largely evaporated, they are less likely to stick when they collide. In certain embodiments, smaller agglomerates contribute to better filtration material deposits formation. Furthermore, it is believed that if droplets collide but contain only a small amount of liquid (such as only internally), the droplets may not coalesce to a spherical shape. In some embodiments, non-spherical agglomerates may provide desirable filtration performance.

In one or more embodiments, the atomizing gas is heated to form a heated atomizing gas, which is then flowed through and/or contacted with the nozzle. In one or more embodiments, the heated atomizing gas is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween.

In one or more embodiments, both the carrier gas and the atomizing gas are independently heated and contacted with the nozzle. In one or more embodiments, the gaseous steam is heated, but the atomizing gas and the nozzle are maintained at a low temperature (approximately equal to room temperature, e.g., 25-40° C.). In one or more embodiments, the atomizing nozzle is cooled during the atomizing. In one or more embodiments, a temperature of the atomizing nozzle is maintained below a boiling point of the liquid vehicle.

The carrier gas is supplied to the apparatus to facilitate drying and carrying the liquid-particulate-binder droplets and resulting agglomerates through the apparatus and into the honeycomb body. In one or more embodiments, the carrier gas is predominantly an inert gas, such as nitrogen, which is especially advantageous for alcohol-based liquid vehicle and droplets. In one or more embodiments, the carrier gas consists essentially of an inert gas. In one or more embodiments, the carrier gas is predominantly one or more inert gases. In one or more embodiments, the carrier gas is predominantly nitrogen gas. In one or more embodiments, the carrier gas is predominantly air. In one or more embodiments, the carrier gas consists essentially of nitrogen or air. In one or more embodiments, the carrier gas is dry. In one or more embodiments, the carrier gas comprises essentially no liquid vehicle upon entry to the chamber. In one or more embodiments, the carrier gas comprises less than 5 weight percent water vapor. In one or more embodiments, the carrier gas is heated prior to being mixed with the droplets. In one or more embodiments, the carrier gas is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween.

The apparatus can comprise a diffusing area downstream of the nozzle. At least some of the intermixing of the gaseous carrier stream with the liquid-particulate-binder droplets occurs in the diffusing area.

Upon intermixing of the gaseous carrier stream with the liquid-particulate-binder droplets inside the chamber, a gas-liquid-particulate-binder mixture is formed. The gas-liquid-particulate-binder mixture is heated at the intermixing zone. In one or more embodiments, droplets of liquid containing particles and binder are present during the intermixing. In one or more embodiments, the gaseous carrier stream is heated prior to intermixing with the liquid-particulate-binder droplets.

In an embodiment, the carrier gas is delivered to the chamber in an annular co-flow surrounding the nozzle. In an embodiment, the carrier gas is delivered to a chamber of the duct in an annular surrounding the nozzle in a co-flow around the droplets at the end of the nozzle.

Evaporation to Form Agglomerates 420. To avoid liquid capillary force impact which may form non-uniform material which may result in high pressure drop penalty, the droplets are dried in an evaporation section of the apparatus, forming dry solid agglomerates, which may be referred to as secondary particles, or "microparticles" which are made up of primary nanoparticles and binder-type material. The liquid vehicle, or solvent, is evaporated and passes through the honeycomb body in a gaseous or vapor phase so that liquid solvent residual or condensation is minimized during material deposition. When the agglomerate is carried into the honeycomb body by gas flow, the residual liquid in the inorganic material should be less than 10 wt %. All liquid is preferably evaporated as a result of the drying and are converted into a gas or vapor phase. The liquid residual could include solvent in the mixture (such as ethanol in the examples), or water condensed from the gas phase. Binder is not considered as liquid residual, even if some or all of the binder may be in liquid or otherwise non-solid state before cure. In one or more embodiments, a total volumetric flow through the chamber is greater than or equal to 5 Nm$^3$/hour and/or less than or equal to 200 Nm$^3$/hour; including greater than or equal to 20 Nm$^3$/hour and/or less than or equal to 100 Nm$^3$/hour; and all values and subranges therebetween. Higher flow rates can deposit more material than lower flow rates. Higher flow rates can be useful as larger cross-sectional area filters are to be produced. Larger cross-sectional area filters may have applications in filter systems for building or outdoor filtration systems.

In one or more embodiments, substantially all of the liquid vehicle is evaporated from the droplets to form agglomerates of the particles and the binder material, the agglomerates being interspersed in the gaseous carrier stream. In one or more embodiments, the apparatus has an evaporation section having an axial length which is sufficient to allow evaporation of at least a portion of the liquid vehicle, including a substantial portion and/or all of the liquid vehicle from the agglomerates.

Regarding flow, in an embodiment, a path of the droplets and a path of the gaseous carrier stream are substantially perpendicular prior to entering the evaporation section. In one or more embodiments, the carrier gas contacts the atomizing nozzle by way of a first path, and wherein a path of the droplets and a second path of the carrier gas are substantially perpendicular to each other prior to entering the evaporation section of the duct.

In another embodiment, a path of the droplets and a path of the gaseous carrier stream are substantially parallel upon entering the evaporation section. In one or more embodiments, a path of the droplets and a path of the gaseous carrier stream are substantially parallel to each other upon entering the evaporation section of the duct. In one or more embodiments, a path of the droplets and a path of the carrier gas are substantially parallel to each other upon entering an evaporation section of the duct.

In an embodiment, the gaseous carrier stream exits the chamber in a direction substantially parallel to gravity. In an embodiment, the gaseous carrier stream exits the chamber in a substantially downward direction. In an embodiment, the gaseous carrier stream exits the chamber in a substantially upward direction.

Deposition in honeycomb body 425. The secondary particles or agglomerates of the primary particles are carried in gas flow, and the secondary particles or agglomerates, and/or aggregates thereof, are deposited on inlet wall surfaces of the honeycomb body when the gas passes through the honeycomb body. In one or more embodiments, the agglomerates and/or aggregates thereof, are deposited onto the porous walls of the plugged honeycomb body. The deposited agglomerates may be disposed on, or in, or both on and in, the porous walls. In one or more embodiments, the plugged honeycomb body comprises inlet channels which are plugged at a distal end of the honeycomb body, and outlet channels which are plugged at a proximal end of the honeycomb body. In one or more embodiments, the agglomerates and/or aggregates thereof, are deposited on, or in, or both on and in, the walls defining the inlet channels.

The flow can be driven by a fan, a blower or a vacuum pump. Additional air can be drawn into the system to achieve a desired flow rate. A desired flow rate is in the range of 5 to 200 m$^3$/hr.

One exemplary honeycomb body is suitable for use as a gasoline particular filter (GPF), and has the following non-limiting characteristics: diameter of 4.055 inches (10.3 cm), length of 5.47 inches (13.9 cm), cells per square inch (CPSI) of 200, wall thickness of 8 mils (203 microns), and average pore size of 14 μm.

In one or more embodiments, the average diameter of the secondary particles or agglomerates is in a range of from 300 nm micron to 10 microns, 300 nm to 8 microns, 300 nm micron to 7 microns, 300 nm micron to 6 microns, 300 nm micron to 5 microns, 300 nm micron to 4 microns, or 300 nm micron to 3 microns. In specific embodiments, the average diameter of the secondary particles or agglomerates is in the range of 1.5 microns to 3 microns, including about 2 microns. The average diameter of the secondary particles or agglomerates can be measured by a scanning electron microscope.

In one or more embodiments, the average diameter of the secondary particles or agglomerates is in a range of from 300 nm to 10 microns, 300 nm to 8 microns, 300 nm to 7 microns, 300 nm to 6 microns, 300 nm to 5 microns, 300 nm to 4 microns, or 300 nm to 3 microns, including the range of 1.5 microns to 3 microns, and including about 2 microns, and there is a ratio in the average diameter of the secondary particles or agglomerates to the average diameter of the primary particles of in range of from about 2:1 to about 67:1; about 2:1 to about 9:1; about 2:1 to about 8:1; about 2:1 to about 7:1; about 2:1 to about 6:1; about 2:1 to about 5:1; about 3:1 to about 10:1; about 3:1 to about 9:1; about 3:1 to about 8:1; about 3:1 to about 7:1; about 3:1 to about 6:1; about 3:1 to about 5:1; about 4:1 to about 10:1; about 4:1 to about 9:1; about 4:1 to about 8:1; about 4:1 to about 7:1; about 4:1 to about 6:1; about 4:1 to about 5:1; about 5:1 to about 10:1; about 5:1 to about 9:1; about 5:1 to about 8:1; about 5:1 to about 7:1; or about 5:1 to about 6:1, and including about 10:1 to about 20:1.

In one or more embodiments, the depositing of the agglomerates onto the porous walls further comprises passing the gaseous carrier stream through the porous walls of the honeycomb body, wherein the walls of the honeycomb body filter out at least some of the agglomerates by trapping the filtered agglomerates on or in the walls of the honeycomb body. In one or more embodiments, the depositing of the agglomerates onto the porous walls comprises filtering the agglomerates from the gaseous carrier stream with the porous walls of the plugged honeycomb body.

Post-Treatment 430. A post-treatment may optionally be used to adhere the agglomerates to the honeycomb body, and/or to each other. That is, in one or more embodiments, at least some of the agglomerates adhere to the porous walls. In one or more embodiments, the post-treatment comprises heating and/or curing the binder when present according to one or more embodiments. In one or more embodiments, the binder material causes the agglomerates to adhere or stick to the walls of the honeycomb body. In one or more embodiments, the binder material tackifies the agglomerates.

Depending on the binder composition, the curing conditions are varied. According to some embodiments, a low temperature cure reaction is utilized, for example, at a temperature of ≤100° C. In some embodiments, the curing can be completed in the vehicle exhaust gas with a temperature ≤950° C. A calcination treatment is optional, which can be performed at a temperature ≤650° C. Exemplary curing conditions are: a temperature range of from 40° C. to 200° C. for 10 minutes to 48 hours.

In one or more embodiments, the agglomerates and/or aggregates thereof are heated after being deposited on the honeycomb body. In one or more embodiments, the heating of the agglomerates causes an organic component of the binder material to be removed from the deposited agglomerates. In one or more embodiments, the heating of the agglomerates causes an inorganic component of the binder material to physically bond the agglomerates to the walls of the honeycomb body. In one or more embodiments, the heating of the agglomerates causes an inorganic component of the binder to form a porous inorganic structure on the porous walls of the honeycomb body. In one or more embodiments, the heating of the deposited agglomerates burns off or volatilizes an organic component of the binder material from the deposited agglomerates.

In an aspect, a method for applying a surface treatment to a plugged honeycomb body comprising porous walls comprises: mixing particles of an inorganic material with a liquid vehicle and a binder material to form a liquid-particulate-binder stream; mixing the liquid-particulate-binder stream with an atomizing gas, directing the liquid-particulate-binder stream into an atomizing nozzle thereby atomizing the particles into liquid-particulate-binder droplets comprised of the liquid vehicle, the binder material, and the particles; conveying the droplets toward the plugged honeycomb body by a gaseous carrier stream, wherein the gaseous carrier stream comprises a carrier gas and the atomizing gas; evaporating substantially all of the liquid vehicle from the droplets to form agglomerates comprised of the particles and the binder material; depositing the agglomerates onto the porous walls of the plugged honeycomb body; wherein the deposited agglomerates are disposed on, or in, or both on and in, the porous walls.

In another aspect, methods for forming a honeycomb body comprise: supplying a suspension to a nozzle that is in fluid communication with a duct comprising an evaporation section, the suspension comprising an inorganic material, a binder material, and a liquid vehicle; supplying a carrier gas to the duct; contacting the nozzle with the carrier gas; in the evaporation section, evaporating at least a portion of the liquid vehicle thereby forming agglomerates of the inorganic material; depositing the agglomerates on walls of the honeycomb body; and binding the inorganic material to the honeycomb body to form a porous inorganic material. The porous inorganic material may comprise primary particles and agglomerates of these primary particles.

A further aspect is: a method for applying an inorganic material to a plugged honeycomb body comprising porous walls, the method comprising: supplying a suspension comprising particles of the inorganic material and a liquid vehicle to a nozzle that is in fluid communication with a duct comprising an evaporation section; atomizing the suspension with an atomizing gas to form droplets; supplying a heated carrier gas; intermixing a gaseous carrier stream including the heated carrier gas with the droplets inside a chamber of the duct to form a gas-liquid-particulate-binder mixture; evaporating at least a portion of the liquid vehicle from the droplets to form agglomerates of the particles, the agglomerates being interspersed in the gaseous carrier stream; passing the agglomerates and the gaseous carrier stream into the plugged honeycomb body in fluid communication with the duct such that the gaseous carrier stream passes through porous walls of the plugged honeycomb body, and the walls of the plugged honeycomb body trap the agglomerates, wherein the agglomerates and/or aggregates thereof are deposited on or in the walls of the honeycomb body.

Apparatus. Examples of apparatuses that may used for processes to deposit inorganic material with optional binder on ceramic honeycomb bodies are shown in FIGS. 2-6. Generally, apparatuses suitable for methods herein include a duct that defines a chamber. The duct may have several sections defining differing spaces and chambers. In one or more embodiments, the droplets and the gaseous carrier stream are conveyed through a duct having an outlet end proximate a plugged honeycomb body. The duct may comprise a converging section for engaging a proximal end of the honeycomb body. A converging section is advantageous in that fluid convection flow is enhanced. The duct may be in sealed fluid communication with the plugged honeycomb body during the depositing step. In one or more embodiments, the duct is adiabatic, or essentially adiabatic. In some embodiments, the nozzle temperature is regulated to achieve favorable atomization.

In one or more embodiments, an average temperature of walls of the duct is less than a temperature of the gaseous carrier stream. In one or more embodiments, an average temperature of walls of the duct is greater than a temperature of the gaseous carrier stream.

In the following, Apparatuses A-D (FIGS. 2-3 and 5-6) schematically show co-flow where a path of the droplets and a path of the gaseous carrier stream are substantially parallel upon entering the evaporation section. Apparatus "T" (FIG. 4) shows the carrier gas contacting an atomizing nozzle by way of a first path, and wherein a path of the droplets and a second path of the carrier gas are substantially perpendicular to each other prior to entering the evaporation section of the duct.

FIG. 2 shows an apparatus 500, Apparatus "A", for forming honeycomb bodies, the apparatus 500 comprising a duct 551, a deposition zone 531, an exit zone 536, an exit conduit 540, and a flow driver 545.

The duct 551 spans from a first end 550 to a second end 555, defining a chamber of the duct comprising: a plenum space 503 at the first end 550 and an evaporation chamber 523 downstream of the plenum space 503. In one or more embodiments, the duct 551 is essentially adiabatic. That is, the duct 551 may have no external sources of heat. The evaporation chamber 523 is defined by an evaporation section 553 of the duct 551, which in this embodiment, comprises a first section of non-uniform diameter 527 and a second section of substantially uniform diameter 529. The evaporation section 553 comprises an inlet end 521 and an outlet end 525. The first section of non-uniform diameter 527 has a diameter that increases from the inlet end 521 toward the section of uniform diameter 529, which creates a diverging space for the flow to occupy.

A carrier gas is supplied to the duct 551 by a conduit 501, which may have a heat source to create a heated carrier gas 505. An atomizing gas 515 and a mixture 510 are separately supplied by individual delivery conduits such as tubing or piping to a nozzle 520, which is at the inlet end 521 of the evaporation section 553 and is in fluid communication with the duct 551, specifically in this embodiment with the evaporation chamber 523. The mixture 510 is atomized in the nozzle 520 with the atomizing gas 515. In one or more embodiments, the mixture 510 comprises an inorganic material, a liquid vehicle, and a binder, as defined herein, which as supplied to the nozzle is a liquid-particulate-binder stream. The liquid-particulate-binder stream is atomized with the atomizing gas 515 into liquid-particulate-binder droplets by the nozzle 520.

In one or more embodiments, the heated carrier gas 505 flows over the nozzle 520. The atomizing gas 515 can be heated to form a heated atomizing gas. Temperature of the nozzle may be regulated as desired.

Outlet flow from the nozzle 520 and flow of the heated carrier gas 505 are both in a "Z" direction as shown in FIG. 2. There may be a diffusing area 522 downstream of the nozzle where at least some intermixing occurs. In this embodiment, the diffusing area 522 is located in the evaporation chamber 523, but in other embodiments, the diffusing area 522 may be located in the plenum space 503 depending on the location of the nozzle.

The outlet flow of from the nozzle intermixes with the heated carrier gas 505, thereby forming a gas-liquid-particulate-binder mixture, which flows through the chamber of the duct 551. Specifically, the gas-liquid-particulate-binder mixture flows through the evaporation chamber 523 of the evaporation section 553 and into the deposition zone 531 at the outlet end 525 of the evaporation section 553. At the intermixing, the gas-liquid-particulate-binder mixture is heated inside the chamber by the heated carrier gas.

In this embodiment, the outlet flow of the nozzle and the heated carrier gas enter the evaporation chamber 523 of the evaporation section 553 from substantially the same direction. In the evaporation chamber 523, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 531 in fluid communication with the duct 551 houses a plugged ceramic honeycomb body 530, for example, a wall-flow particulate filter. The deposition zone 531 has an inner diameter that is larger than the outer diameter of the ceramic honeycomb body 530. To avoid leakage of the gases carrying the ceramic powders, the ceramic honeycomb body 530 is sealed to the inner diameter of deposition zone 531, a suitable seal is, for example, an inflatable "inner tube". A pressure gauge, labelled as "PG" measures the difference in the pressure upstream and downstream from the particulate filter.

The gas-liquid-particulate-binder mixture flows into the ceramic honeycomb body 530 thereby depositing the inorganic material of the mixture on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 530 is an exit zone 536 defining an exit chamber 535. The flow driver 545 is downstream from the ceramic honeycomb body 530, in fluid communication with the deposition zone 531 and the exit zone 536 by way of the exit conduit 540. Non-limiting examples of flow drivers are: fan, blower, and vacuum pump. The aerosolized mixture is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 500 is considered in a downward direction, for example, substantially parallel to the direction of gravity. In other embodiments, the apparatus is configured such that flow is directed in a substantially upward or vertical direction.

In FIG. 3, an apparatus 600, Apparatus "B", for forming honeycomb bodies is shown comprising a duct 651, a deposition zone 631, an exit zone 636, an exit conduit 640, and a flow driver 645.

The duct 651 spans from a first end 650 to a second end 655, defining a chamber of the duct comprising: a plenum space 603 at the first end 650 and an evaporation chamber 623 downstream of the plenum space 603. In one or more embodiments, the diameter of the duct 651 defining the plenum space 603 can be equal to the diameter of the evaporation section 653 of the duct 651 defining the evaporation chamber 623. In one or more embodiments, the duct 651 is essentially adiabatic. That is, the duct 651 may have no external sources of heat. The evaporation chamber 623, in this embodiment, comprises a single section of substantially uniform diameter 629. The evaporation section 653 comprises an inlet end 621 and an outlet end 625.

A carrier gas is supplied to the duct 651 by a conduit 601, which may have a heat source to create a heated carrier gas 605. An atomizing gas 615 and a mixture 610 are separately supplied by individual delivery conduits such as tubing or piping to a nozzle 620, which is at the inlet end 621 of the evaporation section 653 and is in fluid communication with the duct 651, specifically in this embodiment with the evaporation chamber 623. The mixture 610 is atomized in the nozzle 620 with the atomizing gas 615. In one or more embodiments, the mixture 610 comprises an inorganic material, a liquid vehicle, and a binder, as defined herein, which as supplied to the nozzle is a liquid-particulate-binder stream. The liquid-particulate-binder stream is atomized with the atomizing gas 615 into liquid-particulate-binder droplets by the nozzle 620.

In one or more embodiments, the heated carrier gas 605 flows over the nozzle 620. The atomizing gas 615 can be heated to form a heated atomizing gas. The temperature of the nozzle may be regulated as desired.

Figure 3:
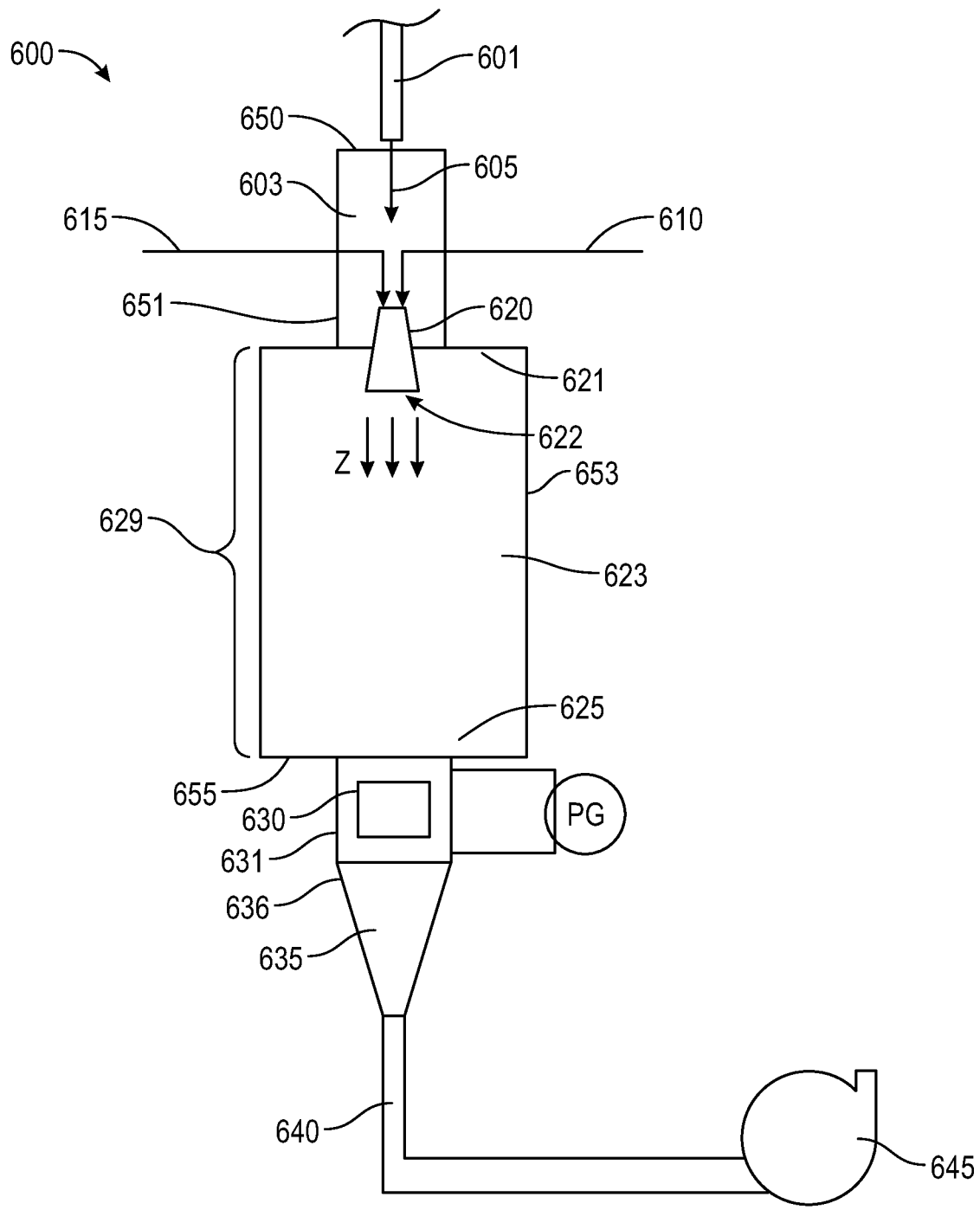
FIG. 3 schematically depicts an apparatus for depositing inorganic material according to embodiments disclosed herein.

Outlet flow from the nozzle 620 and flow of the heated carrier gas 605 are both in a "Z" direction as shown in FIG. 3. Preferably a diffusing area 622 is downstream of the nozzle where at least some intermixing occurs. In this embodiment, the diffusing area 622 is located in the evaporation chamber 623, but in other embodiments the diffusing area may be located in the plenum space 603 depending on the location of the nozzle.

The outlet flow from the nozzle intermixes with the heated carrier gas 605, thereby forming a gas-liquid-particulate-binder mixture, which flows through the chamber of the duct 651. Specifically, the gas-liquid-particulate-binder mixture flows through the evaporation chamber 623 of the evaporation section 653 and into the deposition zone 631 at the outlet end 625 of the evaporation section 653. At the intermixing, the gas-liquid-particulate-binder mixture is heated inside the chamber by the heated carrier gas.

In this embodiment, the outlet flow of the nozzle and the carrier gas enter the evaporation chamber 623 of the evaporation section 653 from substantially the same direction. In the evaporation chamber 623, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 631 in fluid communication with the duct 651 houses a plugged ceramic honeycomb body 630, for example, a wall-flow particulate filter. The deposition zone 631 has an inner diameter that is larger than the outer diameter of the ceramic honeycomb body 630. To avoid leakage of the gases carrying the ceramic powders, the ceramic honeycomb body 630 is sealed to the inner diameter of the deposition zone 631, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 630 thereby depositing the inorganic material of the mixture on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 630 is an exit zone 636 defining an exit chamber 635. The flow driver 645 is downstream from the ceramic honeycomb body 630, in fluid communication with the deposition zone 631 and the exit zone 636 by way of the exit conduit 640. Non-limiting examples of flow drivers are: fan, blower, and vacuum pump. The aerosolized mixture is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 600 is considered in a downward direction, for example, substantially parallel to the direction of gravity. In other embodiments, the apparatus is configured such that flow is directed in a substantially upward or vertical direction.

Figure 4:
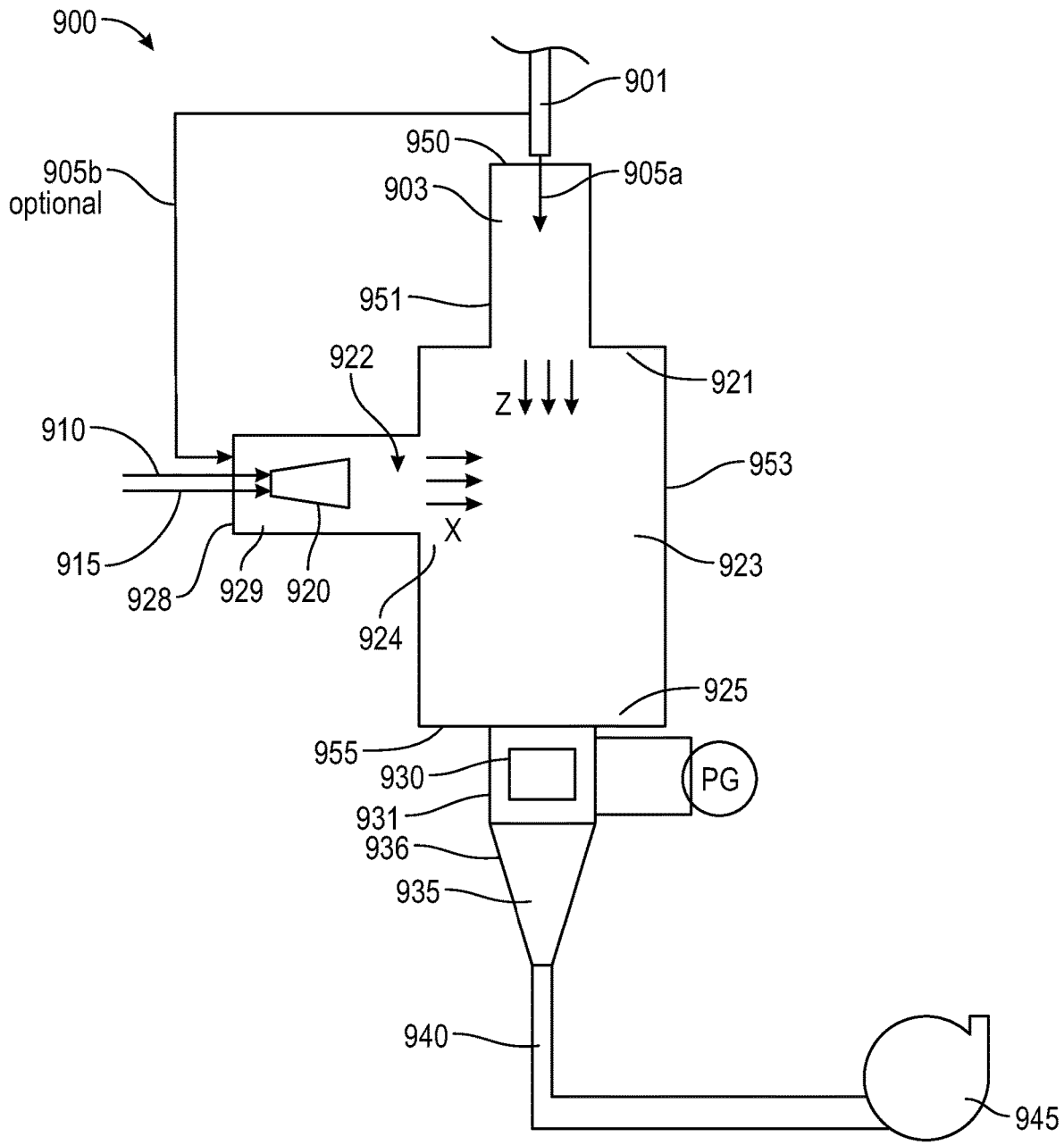
FIG. 4 schematically depicts an apparatus for depositing inorganic material according to embodiments disclosed herein.
Figure 5:
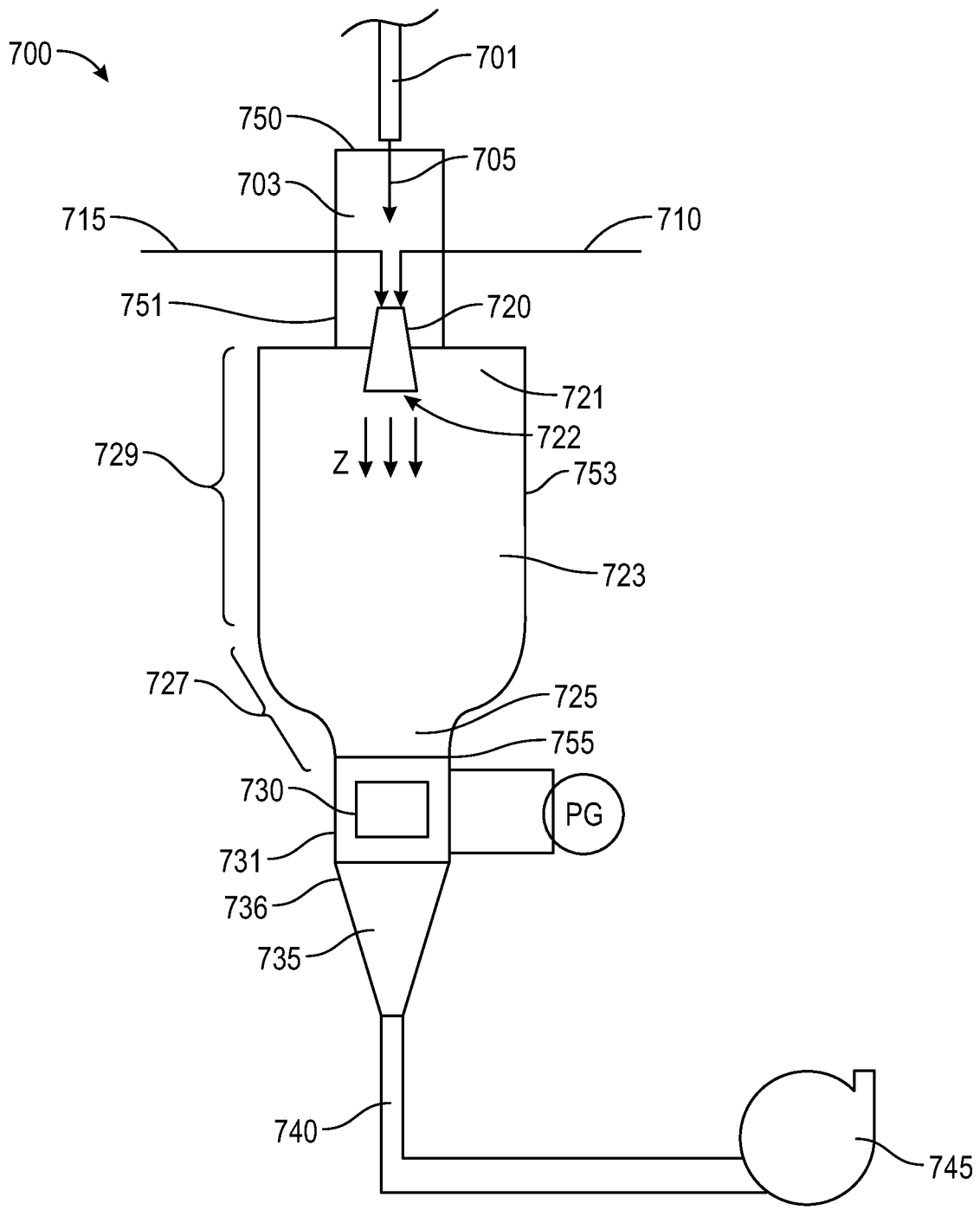
FIG. 5 schematically depicts an apparatus for depositing inorganic material according to embodiments disclosed herein.

In FIG. 4, an apparatus 900, Apparatus "T", for forming honeycomb bodies is shown comprising a duct 951, a deposition zone 931, an exit zone 936, an exit conduit 940, and a flow driver 945.

The duct 951 spans from a first end 950 to a second end 955 including a right cylindrical section 928, all defining a chamber of the duct comprising: a first plenum space 903 at the first end 950, an evaporation chamber 923 downstream of the plenum space 603, and a second plenum space 929 defined by the right cylindrical section 928. In one or more embodiments, the diameter of the duct 951 defining the plenum space 903 can be equal to the diameter of a first inlet location 921 of an evaporation section 953 of the duct 951. In one or more embodiments, the duct 951 is essentially adiabatic. That is, the duct 951 may have no external sources of heat. The evaporation chamber 923 is defined by the evaporation section 953 of the duct 951. The evaporation section 953 comprises the first inlet location 921 from the first plenum space 903, a second inlet location 924 from the second plenum space 929, and an outlet end 925. In some embodiments, some evaporation may occur in at least a portion of second plenum space 929 defined by the right cylindrical section 928.

A carrier gas is supplied in a first path to the duct 951 by a conduit 901, which may have a heat source to create a primary heated carrier gas 905a that enters the first plenum space 903, and optionally another secondary heated carrier gas 905b that enters the second plenum space 929 by a second path. An atomizing gas 915 and a mixture 910 are separately supplied by individual delivery conduits such as tubing or piping to a nozzle 920, which is in the second plenum space 929 of the right cylindrical section 928 and is in fluid communication with the evaporation chamber 923 of the evaporation section 953. The mixture 910 is atomized in the nozzle 920 with the atomizing gas 915. In one or more embodiments, the mixture 910 comprises an inorganic material, a liquid vehicle, and a binder, as defined herein, which as supplied to the nozzle is a liquid-particulate-binder stream. The liquid-particulate-binder stream is atomized with the atomizing gas 915 into liquid-particulate-binder droplets by the nozzle 920.

In one or more embodiments, the secondary heated carrier gas 905b flows over the nozzle 920 Temperature of the nozzle may be regulated as desired.

Outlet flow from the nozzle 920 and, when present, flow of the secondary heated carrier gas 905b are both is in an "X" direction as shown in FIG. 4. Flow of the primary heated carrier gas 905a is in a "Z" direction as shown in FIG. 4. There may be a diffusing area 922 downstream of the nozzle where at least some intermixing occurs. In this embodiment, the diffusing area 922 is located at least partially in the second plenum space 929, but in other embodiments, the diffusing area 922 may be located in evaporation chamber 923 depending on the location of the nozzle.

The outlet flow of from the nozzle intermixes with the heated carrier gases 905a and 905b, thereby forming a gas-liquid-particulate-binder mixture, which flows through the chamber of the duct 951. Specifically, the gas-liquid-particulate-binder mixture flows through the evaporation chamber 923 of the evaporation section 953 and into the deposition zone 931 at the outlet end 925 of the evaporation section 953. At the intermixing, the gas-liquid-particulate-binder mixture is heated inside the chamber by the heated carrier gas.

In this embodiment, the outlet flow of the nozzle and the primary carrier gas 905a enter the evaporation chamber 923 of the evaporation section 953 from substantially perpendicular directions. In the evaporation chamber 923, substantially all of the liquid vehicle from the droplets is evaporated thereby forming agglomerates of the particles and the binder material, the agglomerates being interspersed in a gaseous carrier stream, which is comprised of the carrier gases and the atomizing gas.

The deposition zone 931 in fluid communication with the duct 951 houses a plugged ceramic honeycomb body 930, for example, a wall-flow particulate filter. The deposition zone 931 has an inner diameter that is larger than the outer diameter of the ceramic honeycomb body 930. To avoid leakage of the gases carrying the ceramic powders, the ceramic honeycomb body 930 is sealed to the inner diameter of the deposition zone 931, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 930 thereby depositing the inorganic material of the mixture on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 930 is an exit zone 936 defining an exit chamber 935. The flow driver 945 is downstream from the ceramic honeycomb body 930, in fluid communication with the deposition zone 931 and the exit zone 936 by way of the exit conduit 940. Non-limiting examples of flow drivers are: fan, blower, and vacuum pump. The aerosolized mixture is dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Overall flow through embodiments such as apparatus 900 is considered in a downward direction, for example, substantially parallel to the direction of gravity. In other embodiments, the apparatus is configured such that flow is directed in a substantially upward or vertical direction.

FIG. 5 shows an apparatus 700, Apparatus "C", for forming honeycomb bodies, the apparatus 700 comprising a duct 751, a deposition zone 731, an exit zone 736, an exit conduit 740, and a flow driver 745.

The duct 751 spans from a first end 750 to a second end 755, defining a chamber of the duct comprising: a plenum space 703 at the first end 750 and an evaporation chamber 723 downstream of the plenum space 703. In one or more embodiments, the diameter of the duct 751 defining the plenum space 703 can be equal to the diameter of an evaporation section 753 at an inlet end 721. In one or more embodiments, the duct 751 is essentially adiabatic. That is, the duct 751 may have no external sources of heat. The evaporation chamber 723 is defined by the evaporation section 753 of the duct 751, which in this embodiment, comprises a first section of non-uniform diameter 727 and a second section of substantially uniform diameter 729. The evaporation section 753 comprises the inlet end 721 and an outlet end 725. The first section of non-uniform diameter 727 has a diameter that decreases from the outlet end 725 toward the section of uniform diameter 729, which creates a converging space for the flow as it enters the deposition zone 731.

A carrier gas is supplied to the duct 751 by a conduit 701, which may have a heat source to create a heated carrier gas 705. An atomizing gas 715 and a mixture 710 are separately supplied by individual delivery conduits such as tubing or piping to a nozzle 720, which is at the inlet end 721 of the evaporation section 753 and is in fluid communication with the duct 751, specifically in this embodiment with the evaporation chamber 723. The mixture 710 is atomized in the nozzle 720 with the atomizing gas 715. In one or more embodiments, the mixture 710 comprises an inorganic material, a liquid vehicle, and a binder, as defined herein, which as supplied to the nozzle is a liquid-particulate-binder stream. The liquid-particulate-binder stream is atomized with the atomizing gas 715 into liquid-particulate-binder droplets by the nozzle 720.

In one or more embodiments, the heated carrier gas 705 flows over the nozzle 720. The atomizing gas 715 can be heated to form a heated atomizing gas. Temperature of the nozzle may be regulated as desired.

Outlet flow from the nozzle 720 and flow of the heated carrier gas 705 are both in a "Z" direction as shown in FIG. 5. There may be a diffusing area 722 downstream of the nozzle where at least some intermixing occurs. In this embodiment, the diffusing area 722 is located in the evaporation chamber 723, but in other embodiments, the diffusing area may be located in the plenum space 703 depending on the location of the nozzle.

The outlet flow of from the nozzle intermixes with the heated carrier gas 705, thereby forming a gas-liquid-particulate-binder mixture, which flows through the chamber of the duct 751. Specifically, the gas-liquid-particulate-binder mixture flows through the evaporation chamber 723 of the evaporation section 753 and into the deposition zone 731 at the outlet end 725 of the evaporation section 753. At the intermixing, the gas-liquid-particulate-binder mixture is heated inside the chamber by the heated carrier gas.

In this embodiment, the outlet flow of the nozzle and the heated carrier gas enter the evaporation chamber 723 of the evaporation section 753 from substantially the same direction. In the evaporation chamber 723, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 731 in fluid communication with the duct 751 houses a plugged ceramic honeycomb body 730, for example, a wall-flow particulate filter. The deposition zone 731 has an inner diameter that is larger than the outer diameter of the ceramic honeycomb body 730. To avoid leakage of the gases carrying the ceramic powders, the ceramic honeycomb body 730 is sealed to the inner diameter of the deposition zone 731, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 730 thereby depositing the inorganic material of the mixture on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 730 is an exit zone 736 defining an exit chamber 735. The flow driver 745 is downstream from the ceramic honeycomb body 730, in fluid communication with the deposition zone 731 and the exit zone 736 by way of the exit conduit 740. Non-limiting examples of flow drivers are: fan, blower, and vacuum pump. The droplets of the atomized mixture are aerosolized and dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 700 is considered in a downward direction, for example, substantially parallel to the direction of gravity. In other embodiments, the apparatus is configured such that flow is directed in a substantially upward or vertical direction.

Figure 6:
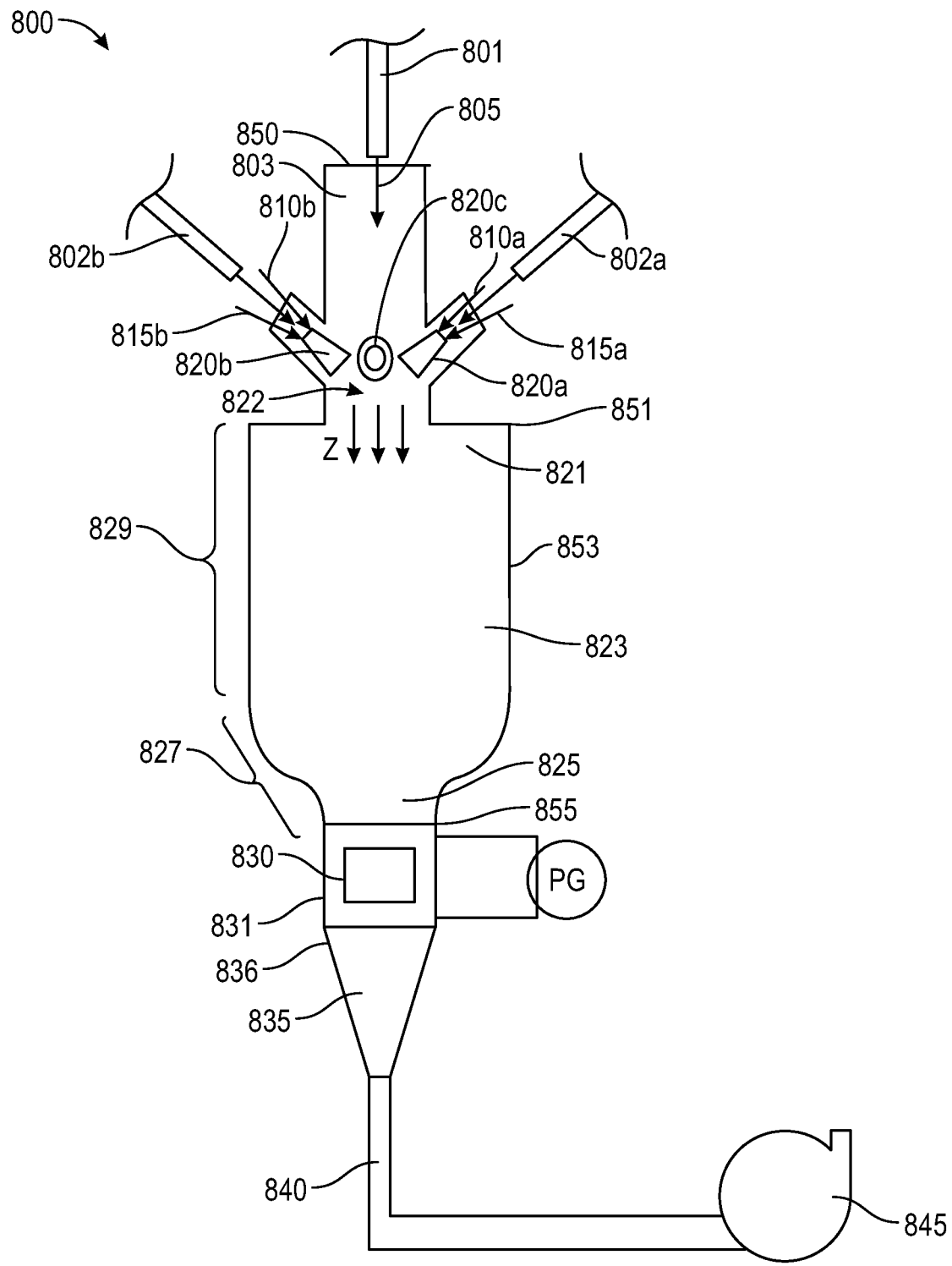
FIG. 6 schematically depicts an apparatus for depositing inorganic material according to embodiments disclosed herein.

FIG. 6 shows an apparatus 800, Apparatus "D", for forming honeycomb bodies, the apparatus 800 comprising a duct 851, a deposition zone 831, an exit zone 836, an exit conduit 840, and a flow driver 845.

The duct 851 spans from a first end 850 to a second end 855, defining a chamber of the duct comprising: a plenum space 803 at the first end 850 and an evaporation chamber 823 downstream of the plenum space 803. In one or more embodiments, the duct 851 is essentially adiabatic. That is, the duct 851 may have no external sources of heat. The evaporation chamber 823 is defined by an evaporation section 853 of the duct 851, which in this embodiment, comprises a first section of non-uniform diameter 827 and a second section of substantially uniform diameter 829. The evaporation section 853 comprises an inlet end 821 and an outlet end 825. The first section of non-uniform diameter 827 has a diameter that decreases from the outlet end 825 toward the section of uniform diameter 829, which creates a converging space for the flow as it enters the deposition zone 831. In some embodiments, the evaporation section 853 is configured to have a single section of substantially uniform diameter analogous to Apparatus "B". Alternatively, the evaporation section 853 has a section of non-uniform diameter that increases from the inlet end 821 toward a section of uniform diameter analogous to Apparatus "A."

A carrier gas is supplied to the duct 851 by a conduit 801, which may have a heat source to create a heated carrier gas 805. An atomizing gas 815 and a mixture 810 are separately supplied by individual delivery conduits such as tubing or piping to a plurality of nozzles 820a, 820b, and 820c, which are in fluid communication with the plenum space 803. Each nozzle has an inflow of the atomizing gas e.g., 815a supplies the nozzle 820a and 815b supplies the nozzle 820b. Each nozzle has an inflow of the mixture e.g., 810a supplies the nozzle 820a and 810b supplies the nozzle 820b. Optionally, each nozzle has a supply of the heated carrier gas, e.g., 802a supplies the nozzle 820a and 802b supplies the nozzle 820b. While the embodiment of FIG. 6 shows three nozzles, in other embodiments, a plurality of nozzles of any number is be used. The mixture 810 is atomized in the nozzle 820 with the atomizing gas 815. In one or more embodiments, the mixture 810 comprises an inorganic material, a liquid vehicle, and a binder, as defined herein, which as supplied to the nozzle is a liquid-particulate-binder stream. The liquid-particulate-binder stream is atomized with the atomizing gas 815 into liquid-particulate-binder droplets by the nozzle 820.

In one or more embodiments, the heated carrier gas 805 and optionally 802a and 802b flow over the nozzles. The atomizing gas 815a and 815b can be heated to form a heated atomizing gas. Temperatures of the nozzles may be regulated, individually or collectively, as desired.

Flow of the heated carrier gas 805 is in a "Z" direction as shown in FIG. 6. While outlet flow from the nozzles 820a, 820b, and 820c may be angled towards a center of the duct 851, upon intermixing with the heated carrier gas 805, the outlet flow of the nozzles will generally be in the "Z" direction. There may be a diffusing area 822 downstream of the nozzles where at least some intermixing occurs. In this embodiment, the diffusing area 822 is located in the plenum space 803, but in other embodiments, the diffusing area may be located in the evaporation chamber 823 depending on the location of the nozzles.

The outlet flow of from the nozzles intermixes with the heated carrier gas 805, thereby forming a gas-liquid-particulate-binder mixture, which flows through the chamber of the duct 851. Specifically, the gas-liquid-particulate-binder mixture flows through the evaporation chamber 823 of the evaporation section 853 and into the deposition zone 831 at the outlet end 825 of the evaporation section 853. At the intermixing, the gas-liquid-particulate-binder mixture is heated inside the chamber by the heated carrier gas.

In this embodiment, the outlet flow of the nozzles and the heated gas enter the evaporation chamber 823 of the evaporation section 853 from substantially the same direction. In the evaporation chamber 823, substantially all of the liquid vehicle from the droplets is evaporated thereby forming agglomerates of the particles and the binder material, the agglomerates being interspersed in a gaseous carrier stream, which is comprised of the carrier gas and the atomizing gas.

The deposition zone 831 in fluid communication with the duct 851 houses a plugged ceramic honeycomb body 830, for example, a wall-flow particulate filter. The deposition zone 831 has an inner diameter that is larger than the outer diameter of the ceramic honeycomb body 830. To avoid leakage of the gases carrying the ceramic powders, the ceramic honeycomb body 830 is sealed to the inner diameter of deposition zone 831, a suitable seal is, for example, an inflatable "inner tube". A pressure gauge, labelled as "PG" measures the difference in the pressure upstream and downstream from the particulate filter. The gas-liquid-particulate-binder mixture flows into the ceramic honeycomb body 830 thereby depositing the inorganic material of the mixture on the ceramic honeycomb body. Specifically, the agglomerates and the gaseous carrier stream pass into the honeycomb body such that the gaseous carrier stream passes through the porous walls of the honeycomb body, and the walls of the honeycomb body trap the agglomerates, wherein the agglomerates and/or aggregates thereof are deposited on or in the walls of the honeycomb body. The inorganic material binds to the ceramic honeycomb body upon post-treatment to the ceramic honeycomb body. In an embodiment, binder material causes the agglomerates to adhere or stick to the walls of the honeycomb body.

Downstream from the ceramic honeycomb body 830 is an exit zone 836 defining an exit chamber 835. The flow driver 845 is downstream from the ceramic honeycomb body 830, in fluid communication with the deposition zone 831 and the exit zone 836 by way of the exit conduit 840. Non-limiting examples of flow drivers are: fan, blower, and vacuum pump. The droplets of the atomized mixture are aerosolized and dried and deposited on one or more walls of the particulate filter as agglomerates of filtration material, which is present as discrete regions of filtration material, or in some portions or some embodiments as a layer, or both, wherein the agglomerates are comprised of primary particles of inorganic material.

Flow through embodiments such as apparatus 800 is considered in a downward direction, for example, substantially parallel to the direction of gravity. In other embodiments, the apparatus may be configured such that flow is directed in a substantially upward or vertical direction.

General Overview of Honeycomb Bodies

The ceramic articles herein comprise honeycomb bodies comprised of a porous ceramic honeycomb structure of porous walls having wall surfaces defining a plurality of inner channels.

In some embodiments, the porous ceramic walls comprise a material such as a filtration material which may comprise in some portions or some embodiments a porous inorganic layer disposed on one or more surfaces of the walls. In some embodiments, the filtration material comprises one or more inorganic materials, such as one or more ceramic or refractory materials. In some embodiments, the filtration material is disposed on the walls to provide enhanced filtration efficiency, both locally through and at the wall and globally through the honeycomb body, at least in the initial use of the honeycomb body as a filter following a clean state, or regenerated state, of the honeycomb body, for example such as before a substantial accumulation of ash and/or soot occurs inside the honeycomb body after extended use of the honeycomb body as a filter.

In one aspect, the filtration material is present in some portions or some embodiments as a layer disposed on the surface of one or more of the walls of the honeycomb structure. The layer in some embodiments is porous to allow the gas flow through the wall. In some embodiments, the layer is present as a continuous coating over at least part of the, or over the entire, surface of the one or more walls. In some embodiments of this aspect, the filtration material is flame-deposited filtration material.

In another aspect, the filtration material is present as a plurality of discrete regions of filtration material disposed on the surface of one or more of the walls of the honeycomb structure. The filtration material may partially block a portion of some of the pores of the porous walls, while still allowing gas flow through the wall. In some embodiments of this aspect, the filtration material is aerosol-deposited filtration material. In some preferred embodiments, the filtration material comprises a plurality of inorganic particle agglomerates, wherein the agglomerates are comprised of inorganic or ceramic or refractory material. In some embodiments, the agglomerates are porous, thereby allowing gas to flow through the agglomerates.

In some embodiments, a honeycomb body comprises a porous ceramic honeycomb body comprising a first end, a second end, and a plurality of walls having wall surfaces defining a plurality of inner channels. A deposited material such as a filtration material, which may be in some portions or some embodiments a porous inorganic layer, is disposed on one or more of the wall surfaces of the honeycomb body. The deposited material such as a filtration material, which may be a porous inorganic layer has a porosity as measured by mercury intrusion porosimetry, SEM, or X-ray tomography in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, and the deposited material such as a filtration material, which may be a porous inorganic layer that has an average thickness of greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 µm. Various embodiments of honeycomb bodies and methods for forming such honeycomb bodies will be described herein with specific reference to the appended drawings.

The material in some embodiments comprises a filtration material, and in some embodiments comprises an inorganic filtration material. According to one or more embodiments, the inorganic filtration material provided herein comprises discrete regions and/or a discontinuous layer formed from the inlet end to the outlet end comprising discrete and disconnected patches of material or filtration material and binder comprised of primary particles in secondary particles or agglomerates that are substantially spherical. In one or more embodiments, the primary particles are non-spherical. In one or more embodiments, "substantially spherical" refers to an agglomerate having a circularity in cross section in a range of from about 0.8 to about 1 or from about 0.9 to about 1, with 1 representing a perfect circle. In one or more embodiments, 75% of the primary particles deposited on the honeycomb body have a circularity of less than 0.8. In one or more embodiments, the secondary particles or agglomerates deposited on the honeycomb body have an average circularity greater than 0.9, greater than 0.95, greater than 0.96, greater than 0.97, greater than 0.98, or greater than 0.99.

Circularity can be measured using a scanning electron microscope (SEM). The term "circularity of the cross-section (or simply circularity)" is a value expressed using the equation shown below. A circle having a circularity of 1 is a perfect circle.

$$\text{Circularity} = (4\pi \times \text{cross-sectional area})/(\text{length of circumference of the cross-section}).$$

A honeycomb body of one or more embodiments may comprise a honeycomb structure and deposited material such as a filtration material disposed on one or more walls of the honeycomb structure. In some embodiments, the deposited material such as a filtration material is applied to surfaces of walls present within honeycomb structure, where the walls have surfaces that define a plurality of inner channels.

The inner channels, when present, may have various cross-sectional shapes, such as circles, ovals, triangles, squares, pentagons, hexagons, or tessellated combinations or any of these, for example, and may be arranged in any suitable geometric configuration. The inner channels, when present, may be discrete or intersecting and may extend through the honeycomb body from a first end thereof to a second end thereof, which is opposite the first end.

Figure 7:
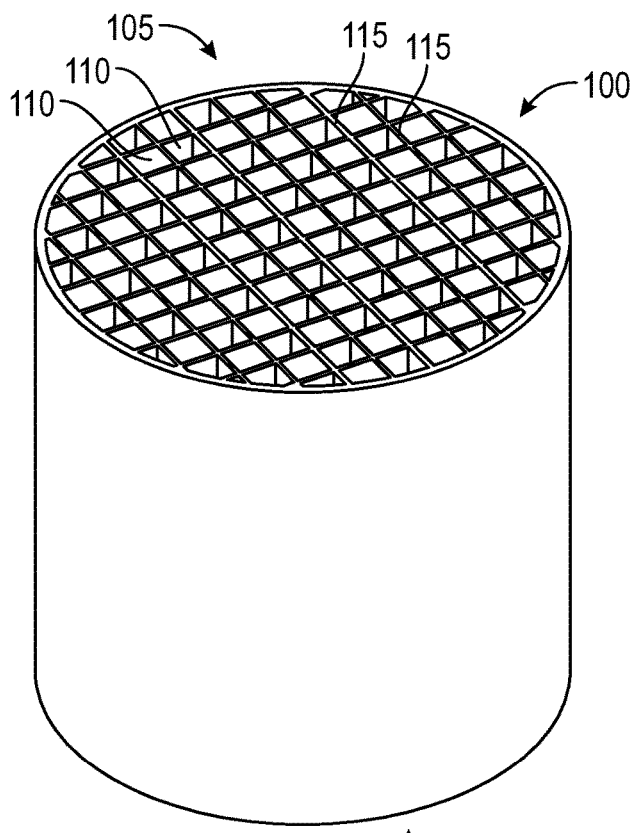
FIG. 7 schematically depicts an unplugged honeycomb body.

With reference now to FIG. 7, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the honeycomb body. The honeycomb body may have one or more of the channels plugged on one, or both of the first end 105 and the second end 135. The pattern of plugged channels of the honeycomb body is not limited. In some embodiments, a pattern of plugged and unplugged channels at one end of the honeycomb body may be, for example, a checkerboard pattern where alternating channels of one end of the honeycomb body are plugged. In some embodiments, plugged channels at one end of the honeycomb body have corresponding unplugged channels at the other end, and unplugged channels at one end of the honeycomb body have corresponding plugged channels at the other end.

In one or more embodiments, the honeycomb body may be formed from cordierite, aluminum titanate, enstatite, mullite, forsterite, corundum (SiC), spinel, sapphirine, and periclase. In general, cordierite has a composition according to the formula $Mg_2Al_4Si_5AlO_{18}$. In some embodiments, the pore size of the ceramic material, the porosity of the ceramic material, and the pore size distribution of the ceramic material are controlled, for example by varying the particle sizes of the ceramic raw materials. In addition, pore formers can be included in ceramic batches used to form the honeycomb body.

In some embodiments, walls of the honeycomb body may have an average thickness from greater than or equal to 25 µm to less than or equal to 250 µm, such as from greater than or equal to 45 µm to less than or equal to 230 µm, greater than or equal to 65 µm to less than or equal to 210 µm, greater than or equal to 65 µm to less than or equal to 190 µm, or greater than or equal to 85 µm to less than or equal to 170 µm. The walls of the honeycomb body can be described to have a base portion comprised of a bulk portion (also referred to herein as the bulk), and surface portions (also referred to herein as the surface). The surface portion of the walls extends from a surface of a wall of the honeycomb body into the wall toward the bulk portion of the honeycomb body. The surface portion may extend from 0 (zero) to a depth of about 10 µm into the base portion of the wall of the honeycomb body. In some embodiments, the surface portion may extend about 5 µm, about 7 µm, or about 9 µm (i.e., a depth of 0 (zero)) into the base portion of the wall. The bulk portion of the honeycomb body constitutes the thickness of wall minus the surface portions. Thus, the bulk portion of the honeycomb body may be determined by the following equation:

$$t_{total} - 2t_{surface}$$

where $t_{total}$ is the total thickness of the wall and $t_{surface}$ is the thickness of the wall surface.

In one or more embodiments, the bulk of the honeycomb body (prior to applying any filtration material) has a bulk mean pore size from greater than or equal to 7 µm to less than or equal to 25 µm, such as from greater than or equal to 12 µm to less than or equal to 22 µm, or from greater than or equal to 12 µm to less than or equal to 18 µm. For example, in some embodiments, the bulk of the honeycomb body may have bulk mean pore sizes of about 10 µm, about 11 µm, about 12 µm, about 13 µm, about 14 µm, about 15 µm, about 16 µm, about 17 µm, about 18 µm, about 19 µm, or about 20 µm. Generally, pore sizes of any given material exist in a statistical distribution. Thus, the term "mean pore size" or "d50" (prior to applying any filtration material) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In specific embodiments, the mean pore size (d50) of the bulk of the honeycomb body (prior to applying any filtration material) is in a range of from 10 µm to about 16 µm, for example 13-14 µm, and the d10 refers to a length measurement, above which the pore sizes of 90% of the pores lie and below which the pore sizes of the remaining 10% of the pores lie, based on the statistical distribution of all the pores is about 7 µm. In specific embodiments, the d90 refers to a length measurement, above which the pore sizes of 10% of the pores of the bulk of the honeycomb body (prior to applying any filtration material) lie and below which the pore sizes of the remaining 90% of the pores lie, based on the statistical distribution of all the pores is about 30 µm. In specific embodiments, the mean or average diameter (D50) of the secondary particles or agglomerates is about 2 microns. In specific embodiments, it has been determined that when the agglomerate mean size D50 and the mean wall pore size of the bulk honeycomb body d50 is such that there is a ratio of agglomerate mean size D50 to mean wall pore size of the bulk honeycomb body d50 is in a range of from 5:1 to 16:1, excellent filtration efficiency results and low pressure drop results are achieved. In more specific embodiments, a ratio of agglomerate mean size D50 to mean wall pore size of the bulk of honeycomb body d50 (prior to applying any filtration material) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the honeycomb body has a surface mean pore size from greater than or equal to 7 µm to less than or equal to 20 µm, such as from greater than or equal to 8 µm to less than or equal to 15 µm, or from greater than or equal to 10 µm to less than or equal to 14 µm. For example, in some embodiments, the surface of the honeycomb body may have surface mean pore sizes of about 8 µm, about 9 µm, about 10 µm, about 11 µm, about 12 µm, about 13 µm, about 14 µm, or about 15 µm.

In some embodiments, the surface of the honeycomb body may have surface porosities, prior to application of a filtration material deposit, of from greater than or equal to 35% to less than or equal to 75% as measured by mercury intrusion porosimetry, SEM, or X-ray tomography. In one or more embodiments, the surface porosity of the honeycomb body may be less than 65%, such as less than 60%, less than 55%, less than 50%, less than 48%, less than 46%, less than 44%, less than 42%, less than 40%, less than 48%, or less than 36% for example.

Figure 8:
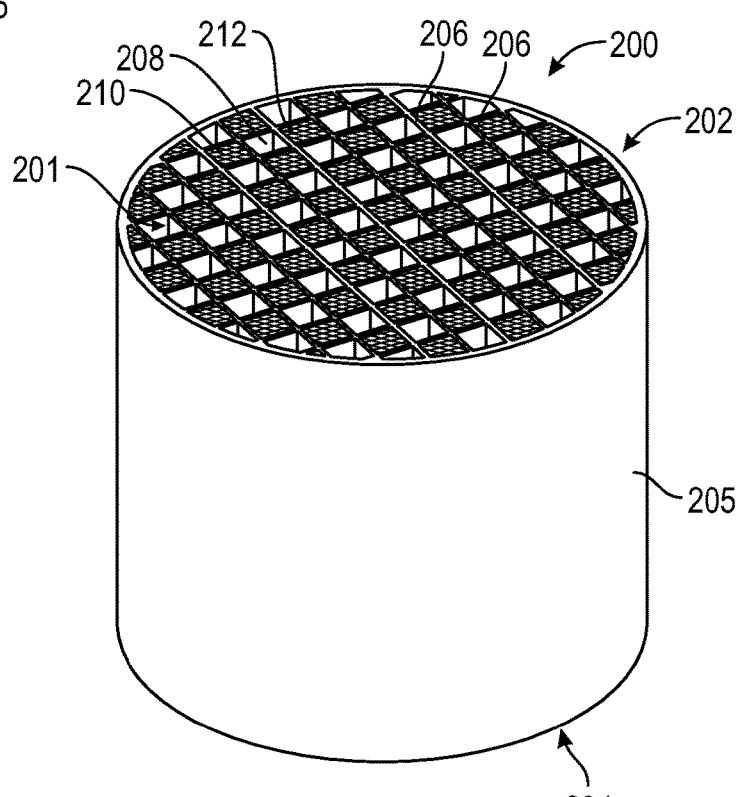
FIG. 8 schematically depicts a wall-flow particulate filter according to embodiments disclosed and described herein.
Figure 9:
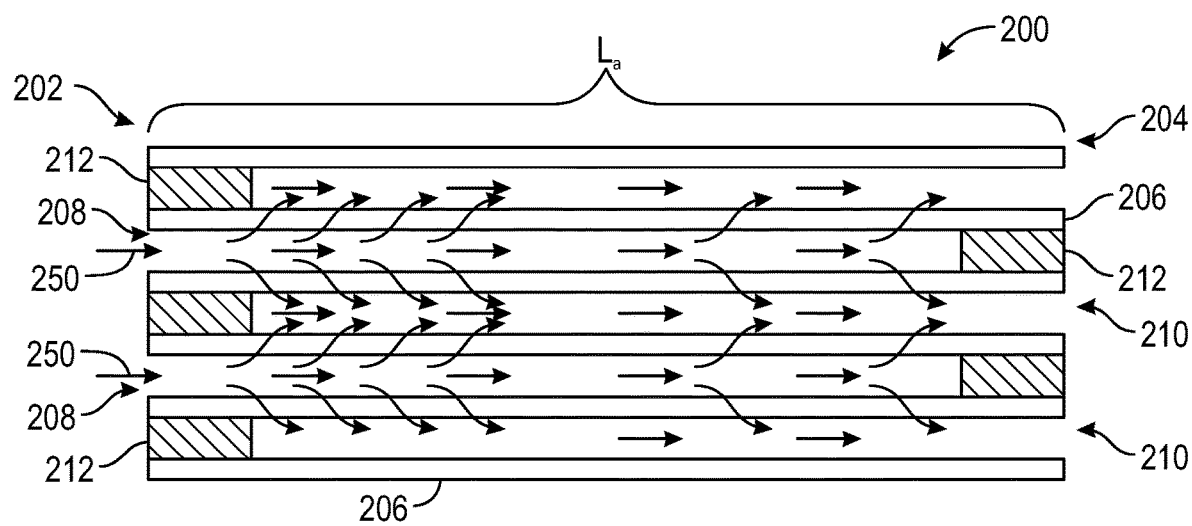
FIG. 9 is a cross-sectional longitudinal view of the particulate filter shown in FIG. 8.

Referring now to FIGS. 8 and 9, a honeycomb body in the form of a particulate filter 200 is schematically depicted. The particulate filter 200 may be used as a wall-flow filter to filter particulate matter from an exhaust gas stream 250, such as an exhaust gas stream emitted from a gasoline engine, in which case the particulate filter 200 is a gasoline particulate filter. The particulate filter 200 generally comprises a honeycomb body having a plurality of channels 201 or cells which extend between an inlet end 202 and an outlet end 204, defining an overall length La (shown in FIG. 9). The channels 201 of the particulate filter 200 are formed by, and at least partially defined by a plurality of intersecting channel walls 206 that extend from the inlet end 202 to the outlet end 204. The particulate filter 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

An axial cross section of the particulate filter 200 of FIG. 8 is shown in FIG. 9. In some embodiments, certain channels are designated as inlet channels 208 and certain other channels are designated as outlet channels 210. In some embodiments of the particulate filter 200, at least a first set of channels may be plugged with plugs 212. Generally, the plugs 212 are arranged proximate the ends (i.e., the inlet end or the outlet end) of the channels 201. The plugs are generally arranged in a pre-defined pattern, such as in the checkerboard pattern shown in FIG. 8, with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 9. Accordingly, each cell may be plugged at or near one end of the particulate filter only.

While FIG. 8 generally depicts a checkerboard plugging pattern, it should be understood that alternative plugging patterns may be used in the porous ceramic honeycomb article. In the embodiments described herein, the particulate filter 200 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 206 of the particulate filter 200 may have a thickness of greater than about 4 mils (101.6 microns). For example, in some embodiments, the thickness of the channel walls 206 may be in a range from about 4 mils up to about 30 mils (762 microns). In some other embodiments, the thickness of the channel walls 206 may be in a range from about 7 mils (177.8 microns) to about 20 mils (508 microns).

In some embodiments of the particulate filter 200 described herein the channel walls 206 of the particulate filter 200 may have a bare open porosity (i.e., the porosity before any coating is applied to the honeycomb body) % $P \geq 35\%$ prior to the application of any coating to the particulate filter 200. In some embodiments the bare open porosity of the channel walls 206 may be such that $40\% \leq \% P \leq 75\%$. In other embodiments, the bare open porosity of the channel walls 206 may be such that $45\% \leq \% P \leq 75\%$, $50\% \leq \% P \leq 75\%$, $55\% \leq \% P \leq 75\%$, $60\% \leq \% P \leq 75\%$, $45\% \leq \% P \leq 70\%$, $50\% \leq \% P \leq 70\%$, $55\% \leq \% P \leq 70\%$, or $60\% \leq \% P \leq 70\%$.

Further, in some embodiments, the channel walls 206 of the particulate filter 200 are formed such that the pore distribution in the channel walls 206 has a mean pore size of ≤30 microns prior to the application of any coatings (i.e., bare). For example, in some embodiments, the mean pore size may be ≥8 microns and less than or ≤30 microns. In other embodiments, the mean pore size may be ≥10 microns and less than or ≤30 microns. In other embodiments, the mean pore size may be ≥10 microns and less than or ≤25 microns. In some embodiments, particulate filters produced with a mean pore size greater than about 30 microns have reduced filtration efficiency while with particulate filters produced with a mean pore size less than about 8 microns may be difficult to infiltrate the pores with a washcoat containing a catalyst. Accordingly, in some embodiments, it is desirable to maintain the mean pore size of the channel wall in a range of from about 8 microns to about 30 microns, for example, in a range of rom 10 microns to about 20 microns.

In one or more embodiments described herein, the honeycomb body of the particulate filter 200 is formed from a metal or ceramic material such as, for example, cordierite, silicon carbide, aluminum oxide, aluminum titanate or any other ceramic material suitable for use in elevated temperature particulate filtration applications. For example, the particulate filter 200 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body are then plugged in a predefined plugging pattern with a ceramic plugging composition and the fired honeycomb body is again fired to ceram the plugs and secure the plugs in the channels.

Figure 10:
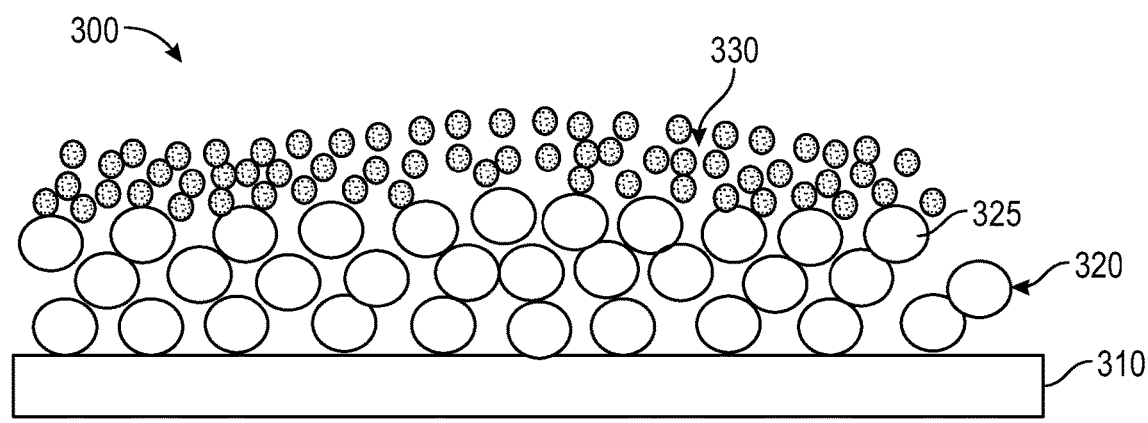
FIG. 10 schematically depicts a wall of a honeycomb body with particulate loading.

In various embodiments the honeycomb body is configured to filter particulate matter from a gas stream, for example, an exhaust gas stream from a gasoline engine. Accordingly, the mean pore size, porosity, geometry and other design aspects of both the bulk and the surface of the honeycomb body are selected taking into account these filtration requirements of the honeycomb body. As an example, and as shown in the embodiment of FIG. 10, a wall 310 of the honeycomb body 300, which can be in the form of the particulate filter as shown in FIGS. 8 and 9, has filtration material deposits 320 disposed thereon, which in some embodiments is sintered or otherwise bonded by heat treatment. The filtration material deposits 320 comprise particles 325 that are deposited on the wall 310 of the honeycomb body 300 and help prevent particulate matter from exiting the honeycomb body along with the gas stream 330, such as, for example, soot and/or ash, and to help prevent the particulate matter from clogging the base portion of the walls 310 of the honeycomb body 300. In this way, and according to embodiments, the filtration material deposits 320 can serve as the primary filtration component while the base portion of the honeycomb body can be configured to otherwise minimize pressure drop for example as compared to honeycomb bodies without such filtration material deposits. The filtration material deposits are formed by the aerosol deposition methods disclosed herein.

As mentioned above, the material, which in some portions or some embodiments may be an inorganic layer, on walls of the honeycomb body is very thin compared to thickness of the base portion of the walls of the honeycomb body. As will be discussed in further detail below, the material, which may be an inorganic layer, on the honeycomb body can be formed by methods that permit the deposited material to be applied to surfaces of walls of the honeycomb body in very thin applications or in some portions, layers. In embodiments, the average thickness of the material, which may be deposit regions or an inorganic layer, on the base portion of the walls of the honeycomb body is greater than or equal to 0.5 µm and less than or equal to 50 µm, or greater than or equal to 0.5 µm and less than or equal to 45 µm, greater than or equal to 0.5 µm and less than or equal to 40 µm, or greater than or equal to 0.5 µm and less than or equal to 35 µm, or greater than or equal to 0.5 µm and less than or equal to 30 µm, greater than or equal to 0.5 µm and less than or equal to 25 µm, or greater than or equal to 0.5 µm and less than or equal to 20 µm, or greater than or equal to 0.5 µm and less than or equal to 15 µm, greater than or equal to 0.5 µm and less than or equal to 10 µm.

As discussed above, the deposited material, which may in some portions or some embodiments be an inorganic layer, can be applied to the walls of the honeycomb body by methods that permit the inorganic material, which may be an inorganic layer, to have a small mean pore size. This small mean pore size allows the material, which may be an inorganic layer, to filter a high percentage of particulate and prevents particulate from penetrating honeycomb and settling into the pores of the honeycomb. The small mean pore size of material, which may be an inorganic layer, according to embodiments increases the filtration efficiency of the honeycomb body. In one or more embodiments, the material, which may be an inorganic layer, on the walls of the honeycomb body has a mean pore size from greater than or equal to 0.1 µm to less than or equal to 5 µm, such as from greater than or equal to 0.5 µm to less than or equal to 4 µm, or from greater than or equal to 0.6 µm to less than or equal to 3 µm. For example, in some embodiments, the material, which may be an inorganic layer, on the walls of the honeycomb body may have mean pore sizes of about 0.5 µm, about 0.6 µm, about 0.7 µm, about 0.8 µm, about 0.9 µm, about 1 µm, about 2 µm, about 3 µm, or about 4 µm.

Although the deposited material, which may be an inorganic layer, on the walls of the honeycomb body may, in some embodiments, cover substantially 100% of the wall surfaces defining inner channels of the honeycomb body, in other embodiments, the material, which may be an inorganic layer, on the walls of the honeycomb body covers less than substantially 100% of the wall surfaces defining inner channels of the honeycomb body. For instance, in one or more embodiments, the deposited material, which may be an inorganic layer, on the walls of the honeycomb body covers at least 70% of the wall surfaces defining inner channels of the honeycomb body, covers at least 75% of the wall surfaces defining inner channels of the honeycomb body, covers at least 80% of the wall surfaces defining inner channels of the honeycomb body, covers at least 85% of the wall surfaces defining inner channels of the honeycomb body, covers at least 90% of the wall surfaces defining inner channels of the honeycomb body, or covers at least 85% of the wall surfaces defining inner channels of the honeycomb body.

As described above with reference to FIGS. 9 and 9, the honeycomb body can have a first end and second end. The first end and the second end are separated by an axial length. In some embodiments, the filtration material deposits on the walls of the honeycomb body may extend the entire axial length of the honeycomb body (i.e., extends along 100% of the axial length). However, in other embodiments, the material, which may be an inorganic layer, on the walls of the honeycomb body extends along at least 60% of the axial length, such as extends along at least 65% of the axial length, extends along at least 70% of the axial length, extends along at least 75% of the axial length, extends along at least 80% of the axial length, extends along at least 85% of the axial length, extends along at least 90% of the axial length, or extends along at least 95% of the axial length.

In embodiments, the material, which may in some portions or some embodiments be an inorganic layer, on the walls of the honeycomb body extends from the first end of the honeycomb body to the second end of the honeycomb body. In some embodiments, the material, which may be an inorganic layer, on the walls of the honeycomb body extends the entire distance from the first surface of the honeycomb body to the second surface of the honeycomb body (i.e., extends along 100% of a distance from the first surface of the honeycomb body to the second surface of the honeycomb body). However, in one or more embodiments, the layer or material, which may be an inorganic layer, on the walls of the honeycomb body extends along 60% of a distance between the first surface of the honeycomb body and the second surface of the honeycomb body, such as extends along 65% of a distance between the first surface of the honeycomb body and the second surface of the honeycomb body, extends along 70% of a distance between the first surface of the honeycomb body and the second surface of the honeycomb body, extends along 75% of a distance between the first surface of the honeycomb body and the second surface of the honeycomb body, extends along 80% of a distance between the first surface of the honeycomb body and the second surface of the honeycomb body, extends along 85% of a distance between the first surface of the honeycomb body and the second surface of the honeycomb body, extends along 90% of a distance between the first surface of the honeycomb body and the second surface of the honeycomb body, or extends along 95% of a distance between the first surface of the honeycomb body and the second surface of the honeycomb body.

The selection of a honeycomb body having a low pressure drop in combination with the low thickness and porosity of the filtration material on the honeycomb body according to embodiments allows a honeycomb body of embodiments to have a low initial pressure drop when compared to other honeycomb bodies. In embodiments, the filtration material is between 0.3 to 30 g/L on the honeycomb body, such as between 1 to 30 g/L on the honeycomb body, or between 3 to 30 g/L on the honeycomb body. In other embodiments, the filtration material is between 1 to 20 g/L on the honeycomb body, such as between 1 to 10 g/L on the honeycomb body. In some embodiments, the increase in pressure drop across the honeycomb due to the application of the filtration material is less than 20% of the uncoated honeycomb. In other embodiments that increase can be less than or equal to 9%, or less than or equal to 8%. In other embodiments, the pressure drop increase across the honeycomb body is less than or equal to 7%, such as less than or equal to 6%. In still other embodiments, the pressure drop increase across the honeycomb body is less than or equal to 5%, such as less than or equal to 4%, or less than or equal to 3%.

Without being bound to any particular theory, it is believed that small pore sizes in the filtration material deposits on the walls of the honeycomb body allow the honeycomb body to have good filtration efficiency even before ash or soot build-up occurs in the honeycomb body. The filtration efficiency of honeycomb bodies is measured herein using the protocol outlined in Tandon et al., 65 CHEMICAL ENGINEERING SCIENCE 4751-60 (2010). As used herein, the initial filtration efficiency of a honeycomb body refers to a new or regenerated honeycomb body that does not comprise any measurable soot or ash loading. In embodiments, the initial filtration efficiency (i.e., clean filtration efficiency) of the honeycomb body is greater than or equal to 70%, such as greater than or equal to 80%, or greater than or equal to 85%. In yet other embodiments, the initial filtration efficiency of the honeycomb body is greater than 90%, such as greater than or equal to 93%, or greater than or equal to 95%, or greater than or equal to 98%.

The material, which is preferably an inorganic filtration material, on the walls of the honeycomb body according to embodiments is thin and has a porosity, and in some embodiments preferably also has good chemical durability and physical stability. The chemical durability and physical stability of the filtration material deposits on the honeycomb body can be determined, in embodiments, by subjecting the honeycomb body to test cycles comprising burn out cycles and an aging test and measuring the initial filtration efficiency before and after the test cycles. For instance, one exemplary method for measuring the chemical durability and the physical stability of the honeycomb body comprises measuring the initial filtration efficiency of a honeycomb body; loading soot onto the honeycomb body under simulated operating conditions; burning out the built up soot at about 650° C.; subjecting the honeycomb body to an aging test at 1050° C. and 10% humidity for 12 hours; and measuring the filtration efficiency of the honeycomb body. Multiple soot build up and burnout cycles may be conducted. A small change in filtration efficiency (ΔFE) from before the test cycles to after the test cycles indicates better chemical durability and physical stability of the filtration material deposits on the honeycomb body. In some embodiments, the ΔFE is less than or equal to 5%, such as less than or equal to 4%, or less than or equal to 3%. In other embodiments, the ΔFE is less than or equal to 2%, or less than or equal to 1%.

In some embodiments, the filtration material deposits on the walls of the honeycomb body may be comprised of one or a mixture of ceramic components, such as, for example, ceramic components selected from the group consisting of $SiO_2$, $Al_2O_3$, MgO, $ZrO_2$, CaO, $TiO_2$, $CeO_2$, $Na_2O$, Pt, Pd, Ag, Cu, Fe, Ni, and mixtures thereof. Thus, the filtration material deposits on the walls of the honeycomb body may comprise an oxide ceramic. As discussed in more detail below, the method for forming the filtration material deposits on the honeycomb body according to embodiments can allow for customization of the filtration material composition for a given application. This may be beneficial because the ceramic components may be combined to match, for example, the physical properties—such as, for example coefficient of thermal expansion (CTE) and Young's modulus, etc. —of the honeycomb body, which can improve the physical stability of the honeycomb body. In some embodiments, the filtration material deposits on the walls of the honeycomb body may comprise cordierite, aluminum titanate, enstatite, mullite, forsterite, corundum (SiC), spinel, sapphirine, and periclase.

In some embodiments, the composition of the filtration material deposits on the walls of the honeycomb body is the same as the composition of the honeycomb body. However, in other embodiments, the composition of the filtration material is different from the composition of the walls of the matrix of the honeycomb body.

The properties of the filtration material deposits and, in turn, the honeycomb body overall are attributable to the ability of applying a sparse or thin porous filtration material having small median pore sizes relative to the host honeycomb body.

In some embodiments, the method of forming a honeycomb body comprises forming or obtaining an aerosol that comprises a ceramic precursor material and a solvent. The ceramic precursor material of the filtration material precursor comprises ceramic materials that serve as a source of, for example, $SiO_2$, $Al_2O_3$, $TiO_2$, MgO, $ZrO_2$, CaO, $CeO_2$, $Na_2O$, Pt, Pd, Ag, Cu, Fe, Ni, and the like.

In one or more embodiments, the suspension is atomized with an atomizing gas to form liquid-particulate-binder droplets comprised of the liquid vehicle, the binder material, and the particles, is directed to a honeycomb body, Agglomerates formed upon removal or evaporation of the liquid vehicle are then deposited on the honeycomb body. In some embodiments, the honeycomb body may have one or more of the channels plugged on one end, such as, for example, the first end of the honeycomb body during the deposition of the aerosol to the honeycomb body. The plugged channels may, in some embodiments, be removed after deposition of the aerosol. But, in other embodiments, the channels may remain plugged even after deposition of the aerosol. The pattern of plugging channels of the honeycomb body is not limited, and in some embodiments all the channels of the honeycomb body may be plugged at one end. In other embodiments, only a portion of the channels of the honeycomb body may be plugged at one end. In such embodiments, the pattern of plugged and unplugged channels at one end of the honeycomb body is not limited and may be, for example, a checkerboard pattern where alternating channels of one end of the honeycomb body are plugged. By plugging all or a portion of the channels at one end of the honeycomb body during deposition of the aerosol, the aerosol may be evenly distributed within the channels of the honeycomb body.

According to one or more embodiments, binders with high temperature (e.g., greater than 400° C.) resistance are preferably included in the agglomerates and filtration material deposits to enhance integrity of the agglomerates and deposits even at high temperatures encountered in exhaust gas emissions treatment systems. In specific embodiments, a filtration material can comprise about 5 to 25 wt % Dowsil™ US-CF-2405, an alkoxy-siloxane resin. The microstructure of the filtration material deposits was similar to the as-deposited morphology after the various tests described below. The inorganic binders Aremco Ceramabind™ 644A and 830 could also be used in in one or more embodiments. The filtration efficiency of both samples were higher than 60% after the high flow blowing test, a high flow test at 850 $Nm^3$/h. The tests demonstrated that the binders, including organic and inorganic binders, caused the primary particles to bind together to form secondary particles (also called agglomerates), which were bound to the filter walls, even when exposed to high temperatures encountered in engine exhaust gas streams. According to one or more embodiments, other inorganic and organic binders such as silicate (e.g. $Na_2SiO_3$), phosphate (e.g. $AlPO_4$, $AlH_2(PO_4)_3$), hydraulic cement (e.g. calcium aluminate), sol (e.g. $mSiO_2 \cdot nH_2O$, $Al(OH)_x \cdot (H_2O)_{6-x}$) and metal alkoxides, could also be utilized, for example to increase mechanical strength by an appropriate curing process.

EMBODIMENTS

The disclosure includes the following numbered embodiments:

1. A method for applying a surface treatment to a plugged honeycomb body comprising porous walls, the method comprising: mixing particles of an inorganic material with a liquid vehicle and a binder material to form a liquid-particulate-binder stream; mixing the liquid-particulate-binder stream with an atomizing gas; directing the liquid-particulate-binder stream into an atomizing nozzle thereby atomizing the particles into liquid-particulate-binder droplets comprised of the liquid vehicle, the binder material, and the particles; conveying the droplets toward the plugged honeycomb body by a gaseous carrier stream, wherein the gaseous carrier stream comprises a carrier gas and the atomizing gas; evaporating substantially all of the liquid vehicle from the droplets to form agglomerates comprised of the particles and the binder material; and depositing the agglomerates onto the porous walls of the plugged honeycomb body; wherein the deposited agglomerates are disposed on, or in, or both on and in, the porous walls.

2. The method of embodiment 1, wherein at least a portion of the carrier gas contacts the atomizing nozzle.

3. The method of any preceding embodiment, wherein the atomizing further comprises supplying a suspension of the particles, the liquid vehicle, and the binder material.

4. The method of any preceding embodiment, wherein at least some of the agglomerates adhere to the porous walls.

5. The method of any preceding embodiment, wherein the binder material tackifies the agglomerates.

6. The method of the preceding embodiment, wherein the liquid-particulate-binder stream mixes with the atomizing gas via the atomizing nozzle.

7. The method of the preceding embodiment, wherein the liquid-particulate-binder stream enters the atomizing nozzle.

8. The method of any preceding embodiment, wherein the mixing of the liquid-particulate-binder stream with the atomizing gas occurs inside the atomizing nozzle.

9. The method of any preceding embodiment, wherein the mixing of the liquid-particulate-binder stream with the atomizing gas occurs outside the atomizing nozzle.

10. The method of any preceding embodiment, wherein the atomizing nozzle is cooled during the atomizing.

11. The method of any preceding embodiment, wherein a temperature of the atomizing nozzle is maintained below a boiling point of the liquid vehicle.

12. The method of any preceding embodiment, wherein the gaseous carrier stream is heated prior to being mixed with the droplets.

13. The method of the preceding embodiment, wherein the gaseous carrier stream is heated to a temperature in the range of from greater than or equal to 50° C. to less than or equal to 500° C.

14. The method of the preceding embodiment, wherein the gaseous carrier stream is heated to a temperature in the range of greater than or equal to 80° C. to less than or equal to 300° C.

15. The method of the preceding embodiment, wherein the gaseous carrier stream is heated to a temperature in the range of greater than or equal to 80° C. to less than or equal to 150° C.

16. The method of any preceding embodiment, wherein the carrier gas is heated prior to being mixed with the droplets.

17. The method of the preceding embodiment, wherein the carrier gas is heated to a temperature in the range of from greater than or equal to 50° C. to less than or equal to 500° C.

18. The method of the preceding embodiment, wherein the carrier gas is heated to a temperature in the range of greater than or equal to 80° C. to less than or equal to 300° C.

19. The method of the preceding embodiment, wherein the carrier gas is heated to a temperature in the range of greater than or equal to 80° C. to less than or equal to 150° C.

20. The method of any of preceding embodiment, wherein the droplets and the gaseous carrier stream are conveyed through a duct having an outlet end proximate the plugged honeycomb body.

21. The method of the preceding embodiment, wherein the duct is in sealed fluid communication with the plugged honeycomb body during the depositing step.

22. The method of any of embodiment 20 to the preceding embodiment, wherein a total volumetric flow through the duct is greater than or equal to 5 $Nm^3$/hour and/or less than or equal to 200 $Nm^3$/hour.

23. The method of the preceding embodiment, wherein the total volumetric flow is greater than or equal to 20 $Nm^3$/hour and/or less than or equal to 100 $Nm^3$/hour.

24. The method of any of embodiment 20 to the preceding embodiment, wherein the duct is essentially adiabatic.

25. The method of any of embodiment 20 to the preceding embodiment, wherein an average temperature of walls of the duct is less than a temperature of the gaseous carrier stream.

26. The method of any of embodiment 20 to the preceding embodiment, wherein an average temperature of walls of the duct is greater than a temperature of the gaseous carrier stream.

27. The method of any preceding embodiment further comprising atomizing a plurality of liquid-particulate-binder streams with a plurality of atomizing nozzles.

28. The method of any of embodiment 20 to the preceding embodiment, wherein the plurality of atomizing nozzles are evenly spaced within a chamber of the duct.

29. The method of any of embodiment 27 to the preceding embodiment, wherein each the plurality of atomizing nozzles is angled toward a center of the duct.

30. The method of any of embodiment 27 to the preceding embodiment, wherein the atomizing gas contributes to breaking up the liquid-particulate-binder stream into the droplets.

31. The method of any preceding embodiment, wherein the depositing of the agglomerates onto the porous walls further comprises passing the gaseous carrier stream through the porous walls of the honeycomb body, wherein the walls of the honeycomb body filter out at least some of the agglomerates by trapping the filtered agglomerates on or in the walls of the honeycomb body.

32. The method of any preceding embodiment, wherein the depositing of the agglomerates onto the porous walls comprises filtering the agglomerates from the gaseous carrier stream with the porous walls of the plugged honeycomb body.

33. The method of any preceding embodiment, wherein an organic component of the binder material is removed from the deposited agglomerates.

34. The method of any preceding embodiment further comprising heating the deposited agglomerates.

35. The method of the preceding embodiment, wherein the heating of the deposited agglomerates burns off or volatilizes an organic component of the binder material from the deposited agglomerates.

36. The method of embodiment 35, wherein the heating of the agglomerates causes an inorganic component of the binder material in the deposited agglomerates to physically bond with the porous walls of the honeycomb body.

37. The method of any of embodiment 35 to the preceding embodiment, wherein the heating of the agglomerates causes an inorganic component of the binder material in the deposited agglomerates to form a porous inorganic structure on the porous walls of the honeycomb body.

38. The method of any preceding embodiment, wherein the carrier gas is nitrogen.

39. The method of any preceding embodiment, wherein the carrier gas consists essentially of an inert gas.

40. The method of any preceding embodiment, wherein the carrier gas is predominantly one or more inert gases.

41. The method of any preceding embodiment, wherein the carrier gas is predominantly nitrogen gas.

42. The method of any preceding embodiment, wherein the carrier gas is predominantly air.

43. The method of any preceding embodiment, wherein the carrier gas consists essentially of nitrogen or air.

44. The method of any preceding embodiment, wherein the carrier gas is dry.

45. The method of any preceding embodiment, wherein the carrier gas comprises less than 5 weight percent water vapor.

46. The method of embodiment 20, wherein the carrier gas comprises essentially no liquid vehicle upon entry to a chamber of the duct.

47. The method of any of embodiment 20 to the preceding embodiment, wherein the duct comprises an evaporation section having an axial length configured to allow evaporation of a substantial portion or all of the liquid vehicle from the agglomerates.

48. The method of any of embodiment 20 to embodiment 47, wherein the carrier gas contacts the atomizing nozzle by way of a first path, and wherein a path of the droplets and a second path of the carrier gas are substantially perpendicular to each other prior to entering an evaporation section of the duct.

49. The method of any of embodiment 20 to embodiment 47, wherein a path of the droplets and a path of the gaseous carrier stream are substantially parallel to each other upon entering an evaporation section of the duct.

50. The method of any of embodiment 20 to embodiment 47, wherein a path of the droplets and a path of the carrier gas are substantially parallel to each other upon entering an evaporation section of the duct.

51. The method of any of embodiment 20 to the preceding embodiment, wherein the carrier gas is delivered to a chamber of the duct in an annular surrounding the nozzle in a co-flow around the droplets at the end of the nozzle.

52. The method of any of embodiment 20 to the preceding embodiment, wherein the duct comprises a diffusing area downstream of the nozzle.

53. The method of any of embodiment 20 to the preceding embodiment, wherein the duct comprises a converging section for engaging a proximal end of the honeycomb body.

54. The method of any preceding embodiment, wherein the plugged honeycomb body comprises inlet channels which are plugged at a distal end of the honeycomb body, and outlet channels which are plugged at a proximal end of the honeycomb body.

55. The method of the preceding embodiment, wherein the agglomerates are deposited on the walls defining the inlet channels.

56. The method of any of preceding embodiment, wherein the liquid vehicle has a vapor pressure that is greater than the vapor pressure of water at the temperature of the gaseous carrier stream.

57. The method of any of preceding embodiment, wherein the liquid vehicle consists essentially of a material having a boiling point below the boiling point of water at the temperature of the gaseous carrier stream.

58. The method of any of preceding embodiment, wherein the liquid vehicle is an alcohol.

59. The method of the preceding embodiment, wherein the liquid vehicle is methoxyethanol, ethanol, xylene, methanol, ethylacetate, benzene, or mixtures thereof.

60. The method of the preceding embodiment, wherein the liquid vehicle is ethanol.

61. The method of any of preceding embodiment, wherein the liquid vehicle consists essentially of water.

62. The method of any of embodiment 1 to embodiment 60, wherein the gaseous carrier stream exits the chamber in a direction substantially parallel to gravity.

63. The method of any of embodiment 1 to embodiment 60, wherein the gaseous carrier stream exits the chamber in a substantially downward direction.

64. The method of any of embodiment 1 to embodiment 60, wherein the gaseous carrier stream exits the chamber in a substantially upward direction.

65. The method of any preceding embodiment, wherein the liquid-particulate-binder droplets are directed into the chamber by a plurality of nozzles.

66. The method of any preceding embodiment, wherein an average size of the liquid-particulate-droplets is greater than or equal to 1 µm and less than or equal to 15 µm.

67. The method of the preceding embodiment, wherein the average size of the liquid-particulate-droplets is greater than or equal to 2 µm and less than or equal to 8 µm.

68. The method of the preceding embodiment, wherein the average size of the liquid-particulate-droplets is greater than or equal to 4 µm and less than or equal to 8 µm.

69. The method of the preceding embodiment, wherein the average size of the liquid-particulate-droplets is greater than or equal to 4 µm and less than or equal to 6 µm.

70. A method for forming a honeycomb body comprising: supplying a suspension to a nozzle that is in fluid communication with a duct comprising an evaporation section, the suspension comprising an inorganic material, a binder material, and a liquid vehicle; supplying a carrier gas to the duct; contacting the nozzle with the carrier gas; in the evaporation section, evaporating at least a portion of the liquid vehicle thereby forming agglomerates of the inorganic material; depositing the agglomerates on walls of the honeycomb body; and binding the inorganic material to the honeycomb body to form a porous inorganic material.

71. The method of embodiment 70 further comprising mixing the suspension with an atomizing gas.

72. The method of any of embodiment 70 to the preceding embodiment, wherein an outlet flow of the nozzle and the carrier gas enter an evaporation chamber of the evaporation section from substantially the same direction.

73. The method of any of embodiment 70 to the preceding embodiment, further comprising heating the carrier gas to form a heated carrier gas.

74. The method of any of embodiment 70 to the preceding embodiment, wherein supplying the carrier gas comprises flowing the carrier gas through a heated fluid conduit to form a heated carrier gas.

75. The method of any of embodiments 73 to 74, wherein the heated carrier gas is at a temperature in the range of from greater than or equal to 50° C. to less than or equal to 500° C.

76. The method of the preceding embodiment, wherein the temperature is in the range of greater than or equal to 80° C. to less than or equal to 300° C.

77. The method of the preceding embodiment, wherein the temperature is in the range of greater than or equal to 80° C. to less than or equal to 150° C.

78. The method of any of embodiment 70 to the preceding embodiment, wherein a total volumetric flow through the chamber of the duct is greater than or equal to 5 Nm³/hour and/or less than or equal to 200 Nm³/hour.

79. The method of the preceding embodiment, wherein a total volumetric flow through the chamber of the duct is greater than or equal to 20 Nm³/hour and/or less than or equal to 100 Nm³/hour.

80. The method of any of embodiment 70 to the preceding embodiment, wherein the duct is essentially adiabatic.

81. The method of any of embodiment 70 to the preceding embodiment, wherein an average temperature of walls of the duct is less than a temperature of the gaseous carrier stream.

82. The method of any of embodiment 70 to the preceding embodiment, wherein an average temperature of walls of the duct is greater than a temperature of the gaseous carrier stream.

83. The method of any of embodiment 70 to the preceding embodiment, wherein the duct comprises a section of substantially uniform diameter.

84. The method of any of embodiment 70 to the preceding embodiment, wherein the duct comprises a section of non-uniform diameter.

85. The method of any of embodiment 70 to the preceding embodiment, wherein a first section of non-uniform diameter is at an inlet end of the evaporation section.

86. The method of the preceding embodiment, wherein the first section of non-uniform diameter has a diameter that increases from the inlet end of the evaporation section to a section of substantially inform diameter.

87. The method of any of embodiment 70 to the preceding embodiment, wherein a second section of non-uniform diameter is near an outlet end of the evaporation section.

88. The method of the preceding embodiment, wherein the second section of non-uniform diameter has a diameter that decreases towards the outlet end of the evaporation section.

89. The method of any of embodiment 70 to the preceding embodiment, wherein the inorganic material in the suspension is supplied to a plurality of nozzles in fluid communication with the chamber of the duct.

90. The method of the preceding embodiment further comprising directing a portion of the gaseous carrier stream in contact with the plurality of nozzles.

91. The method of any of embodiment 70 to the preceding embodiment, wherein the porous inorganic material on at least a portion of a wall of the honeycomb body is present in the form of a layer which has an average thickness greater than about 0.5 μm and less than or equal to 50 μm.

92. The method of any of embodiment 70 to the preceding embodiment, wherein the porous inorganic material comprises an oxide ceramic.

93. The method of any of embodiment 70 to the preceding embodiment, wherein the inorganic material comprises a ceramic material.

94. The method of any of embodiment 70 to the preceding embodiment, wherein the suspension is organic-based.

95. The method of the preceding embodiment, wherein the liquid vehicle comprises: methoxyethanol, ethanol, water, xylene, methanol, ethylacetate, benzene, or mixtures thereof.

96. The method of any of embodiment 70 to the preceding embodiment that is effective to create a substantially symmetric velocity profile in the chamber of the duct.

97. The method of any of embodiment 70 to the preceding embodiment that is effective to create a substantially symmetrical heat profile in the chamber of the duct.

98. A method for applying an inorganic material to a plugged honeycomb body comprising porous walls, the method comprising: supplying a suspension comprising particles of the inorganic material and a liquid vehicle to a nozzle that is in fluid communication with a duct comprising an evaporation section; atomizing the suspension with an atomizing gas to form droplets; supplying a heated carrier gas; intermixing a gaseous carrier stream including the heated carrier gas with the droplets inside a chamber of the duct to form a gas-liquid-particulate-binder mixture; evaporating at least a portion of the liquid vehicle from the droplets to form agglomerates of the particles, the agglomerates being interspersed in the gaseous carrier stream; passing the agglomerates and the gaseous carrier stream into the plugged honeycomb body in fluid communication with the duct such that the gaseous carrier stream passes through porous walls of the plugged honeycomb body, and the walls of the plugged honeycomb body trap the agglomerates, wherein the agglomerates are deposited on or in the walls of the honeycomb body.

Figure 2:
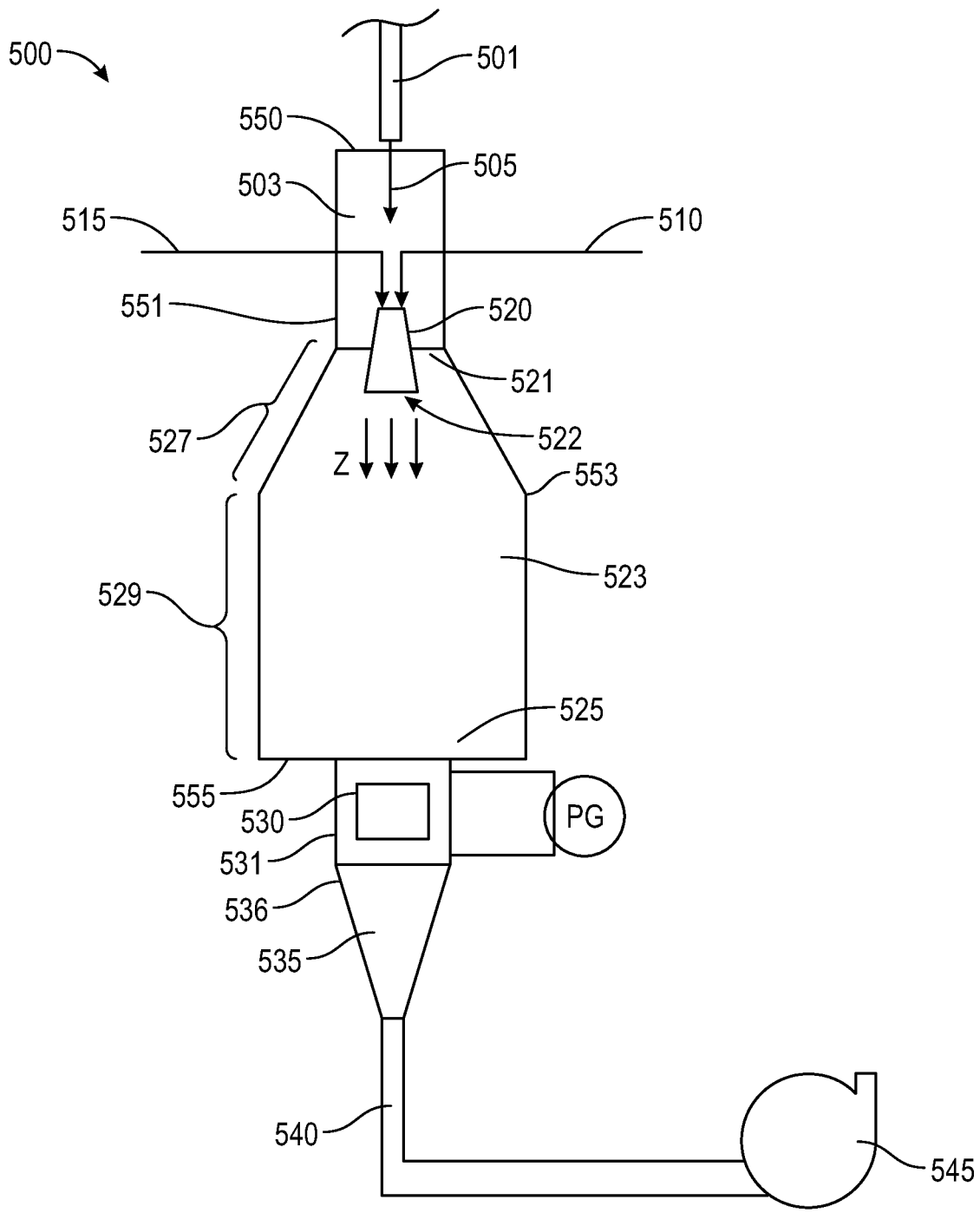
FIG. 2 schematically depicts an apparatus for depositing inorganic material according to embodiments disclosed herein.

99. The method of embodiment 98, wherein the heated carrier gas is at a temperature in the range of from greater than or equal to 50° C. to less than or equal to 500° C.

100. The method of embodiment 98 or 99, wherein an outlet flow of the nozzle and the gaseous carrier stream enter an evaporation chamber of the evaporation section from substantially the same direction.

101. The method of one of embodiments 98 to 100, wherein the evaporation section comprises a section of uniform diameter, and a section of non-uniform diameter having a diameter that decreases towards from the section of uniform diameter to an outlet end of the evaporation section.

102. The method of one of embodiments 98 to 101, wherein the suspension is supplied to a plurality of nozzles in fluid communication with the chamber of the duct.

103. An apparatus for applying an inorganic material to a plugged honeycomb body comprising porous walls, the apparatus comprising: a duct spanning from a first end to a second end; a deposition zone for housing the plugged honeycomb body in fluid communication with the duct at the second end of the duct; a heat source; a carrier gas supply, an atomizing gas supply, and a mixture supply; and an atomizing nozzle in fluid communication with a chamber of the duct.

104. The apparatus of embodiment 103, wherein the duct comprises a section of uniform diameter and a section of non-uniform diameter.

105. The apparatus of the preceding embodiment, wherein the duct comprises a first section of non-uniform diameter and a second section of non-uniform diameter.

106. The apparatus of the preceding embodiment, wherein the first section of non-uniform diameter is located at the first end of the duct and comprises a diameter that increases from the first end toward the section of uniform diameter and the second section of non-uniform diameter comprises a diameter that decreases from the section of uniform diameter toward the deposition zone.

107. The apparatus of any of embodiments 103 to 106, wherein the heat source is in contact with an external wall of the duct.

108. The apparatus of any of embodiments 103 to 107, wherein the heat source is in contact with the carrier gas supply.

EXAMPLES

Embodiments will be further understood by the following non-limiting examples.

Examples 1-3—Modeling

Apparatuses "A" (FIG. 2), "B" (FIG. 3), and "C" (FIG. 5) were analyzed using Computational Fluid Mechanics modeling software (Fluent). Inputs to the model were: carrier gas of nitrogen ($N_2$) at a flow rate of: 16 $Nm^3/hr$ ($Nm^3/hr$ is cubic meters/hr at 20° C.); carrier gas temperature of 200° C.; solution flow rate of 24 g/min; solution solids content of: 11% by weight; and atomizing gas ($N_2$) at a flow rate of: 5 $Nm^3/hr$.

Example 4—Modeling

Apparatus "Tx" was analyzed in accordance with the modeling software used for Examples 1-3. Inputs to the model were: carrier gas stream of nitrogen ($N_2$) at a flow rate of: 16 $Nm^3/hr$; solution flow rate of 24 g/min; solution solids content of: 11% by weight; atomizing gas ($N_2$) at a flow rate of: 5 $Nm^3/hr$. Apparatus "Tx" included external heating for modeling purposes, which is in contrast to the modeling which had no external heating. The Apparatus Tx included an evaporation section comprising a first section of non-uniform diameter and a second section of substantially uniform diameter analogous to that of 527 and 529, respectively, of Apparatus "A" of FIG. 2. The Apparatus Tx also included a right cylindrical section intersecting second section of substantially uniform diameter analogous to that of 928 Apparatus "T" of FIG. 4, which as noted is essentially adiabatic operation. By simulated external heaters to the Apparatus Tx, walls of the first section of non-uniform diameter were heated to 350° C., and walls of the second section of substantially uniform diameter were heated to 200° C.

Example 5

Modeling Analysis

The designs of Apparatuses A-C included co-flow of the carrier gas ($N_2$) in the same direction as the atomized stream, all in a vertical part. The design of Apparatus Tx included a right cylindrical section with an atomized stream in a horizontal part and a carrier gas ($N_2$) being heated by simulated wall heaters and injected in the vertical part.

Apparatus Tx with external heating indicated by modeling that some inefficiencies may be associated therewith, and Apparatuses A-C were more efficient.

Figure 11:
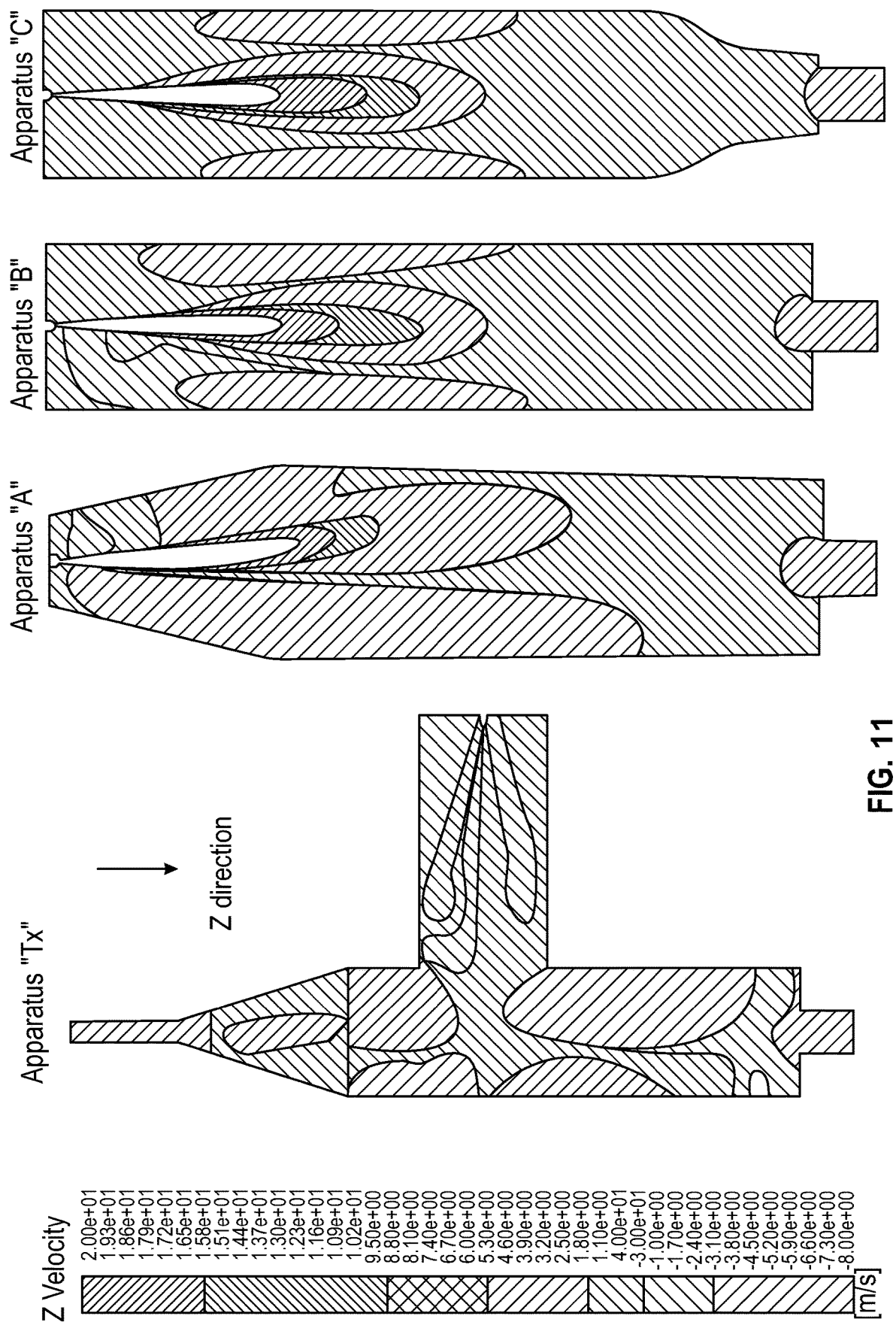
FIG. 11 schematically depicts modeled velocity contour drawings of flow velocity in the Z direction of an apparatus according to embodiments disclosed herein.

FIG. 11 schematically depicts modeled contour drawings of flow velocity in the Z direction of Apparatuses A-C and Tx. For Apparatus C, a substantially symmetric velocity profile was achieved. For Apparatus B, a semi-symmetric velocity profile was achieved in that there was some slight asymmetric heating at an inlet end of an evaporation section, and a substantially symmetric velocity profile was achieved for more than half (about 75%) of the axial length starting from an outlet end of the evaporation section. For Apparatus A, there was asymmetric velocity for more than half of the axial length starting from the inlet end of the evaporation section. For Apparatus Tx, the carrier gas in the Z direction encountered multiple recirculation zones, due in part from a high-velocity atomizer jet, that led to material loss due to deposition on the duct wall (also see FIG. 13) at an impingement zone, as well as longer particle residence time in the apparatus. Non-axisymmetric flow patterns shown for Apparatus Tx in FIG. 11 could result in agglomerates entering the honeycomb body channels in a non-uniform way.

Figure 12:
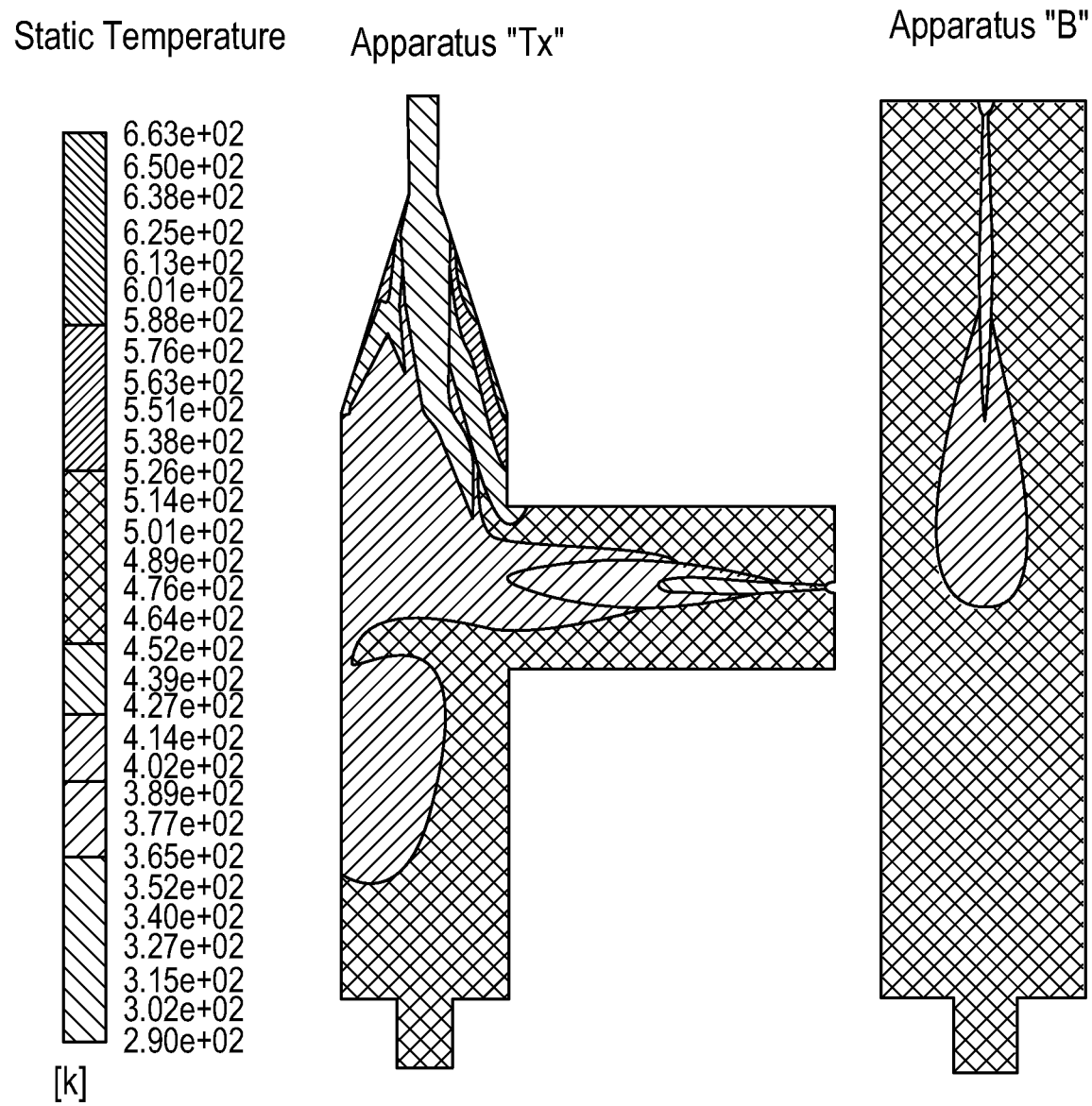
FIG. 12 schematically depicts modeled temperature contour drawings of temperature of an apparatus according to embodiments disclosed herein.

FIG. 12 schematically depicts modeled contour drawings of temperature of apparatuses according Apparatuses B and Tx. For Apparatus B, a substantially symmetric temperature profile was achieved. For Apparatus Tx, the carrier gas was not heated in a uniform and efficient way as shown by the temperature contours.

Figure 13:
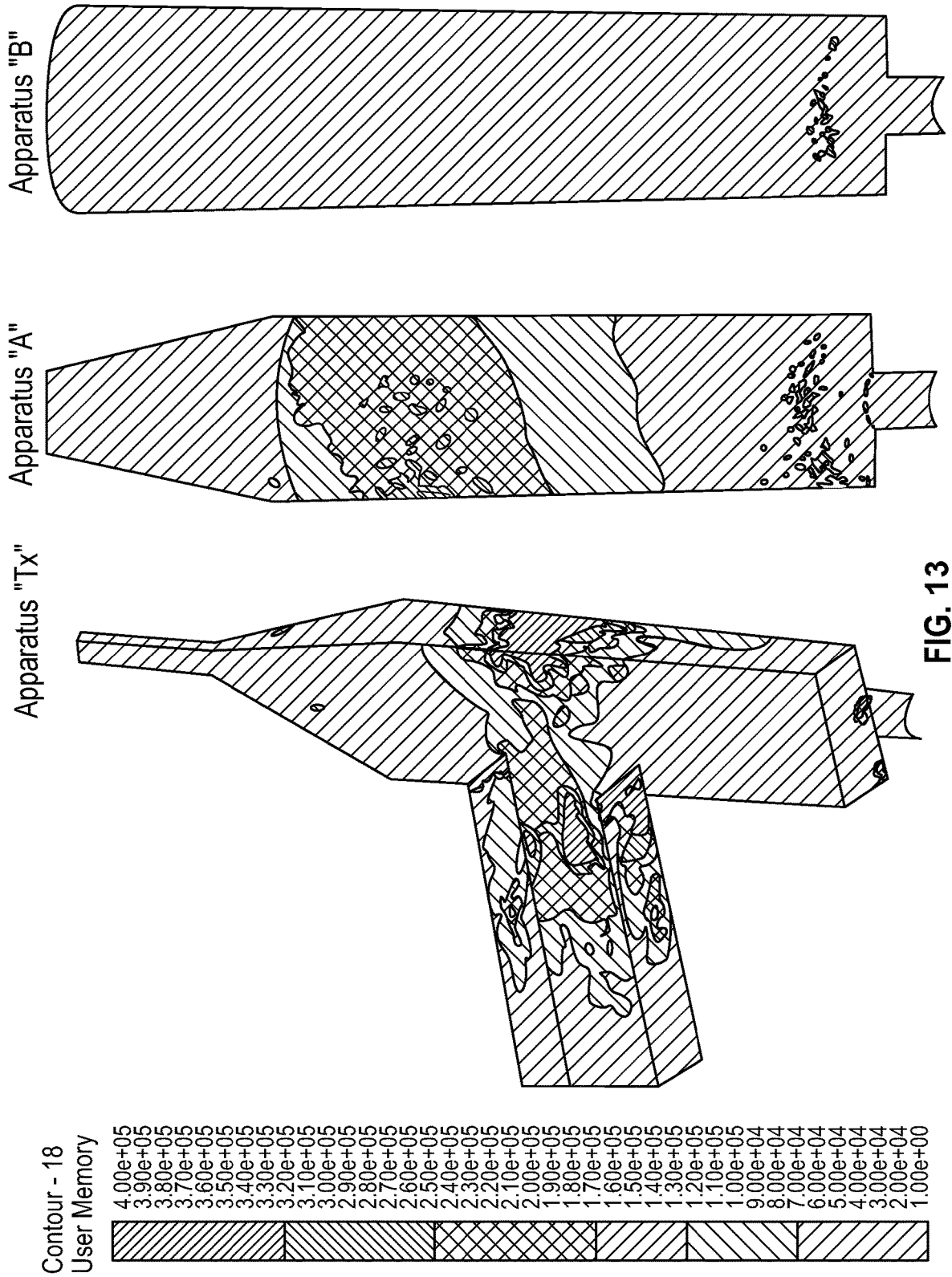
FIG. 13 schematically depicts modeled particle density contour drawings of particles inside an apparatus according to embodiments disclosed herein.

FIG. 13 schematically depicts modeled contour drawings of particle density of apparatuses according to Apparatuses A-B and Tx. Apparatus B showed the least amount of particles residual on walls of a duct of the apparatus. Without intended to be bound by theory, it is thought that a sudden change of the geometry from the duct into a honeycomb body could cause agglomerates to non-uniformly enter the body. Additionally, a corner area of the duct could also accumulate an amount of material loss due to agglomerates depositing on the duct wall.

Based on the modeling results and analysis, Apparatus C, a co-flow system with heated co-flow carrier gas (e.g., $N_2$) and convergent section before the entry to the honeycomb body is a preferred embodiment. This apparatus generated an axisymmetric flow field with less recirculation zones (FIG. 11). Moreover, since the co-flow $N_2$ was preheated and directly surrounded the atomizer jet, the agglomerate production efficiency is better, because there is less deposition on the chamber wall. The co-flow design has significantly less agglomerates depositing on the duct wall (FIG. 13 for of Apparatuses A-B), which means significantly less material loss. With the use of convergent section before the particulate filter inlet, particle tracking for Apparatuses A-C was more uniform than Apparatus Tx.

In summary, the co-flow systems are able to produce agglomerates more efficiently with significant less material loss; generate flow field and particle tracking in a more uniform way; have multiple co-flow atomizers in a single chamber to decrease deposition time for a single plugged honeycomb body (e.g., wall flow filter such as a GPF).

Examples 6-7 and Examples A-B

A honeycomb body was formed as follows by deposition of an inorganic material on its porous walls. Table 1 provides a summary of apparatuses used and conditions and resulting normalized material deposited. For all of the examples, the following were used. The nozzle type was SU11 made by Spraying Systems. The suspension flow rate was 18 g/min; suspension comprised: 11 weight percent alumina particulate and 89 weight percent ethanol. The atomizing nitrogen flow rate was 5.3 $Nm^3$/hr. The carrier gas was air.

TABLE 1

| Example | Apparatus | Total volumetric flow rate $Nm^3$/hr | Air flow rate $Nm^3$/hr | Air temperature ° C. | Normalized Material deposited on honeycomb |
|---|---|---|---|---|---|
| Example A | Tx | 21.5 | 16.2 | N/A[1] | 100 |
| Example 6 | C | 21.5 | 16.2 | 200° C. | 139 |
| Example B | Tx | 40 | 34.7 | N/A[1] | 100 |
| Example 7 | C | 40 | 34.7 | 200° C. | 158 |

[1]Walls of the first section of non-uniform diameter were heated to 350° C., and walls of the second section of substantially uniform diameter were heated to 200° C.

There was better material utilization in Examples 6-7 relative to Examples A-B.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for applying a surface treatment to a plugged fired honeycomb body comprising porous walls, the method comprising:

mixing particles of an inorganic material with a liquid vehicle and a binder material to form a liquid-particulate-binder stream;

mixing the liquid-particulate-binder stream with an atomizing gas;

directing the liquid-particulate-binder stream into an atomizing nozzle thereby atomizing the liquid-particulate-binder stream into liquid-particulate-binder droplets comprised of the liquid vehicle, the binder material, and the particles of the inorganic material;

conveying the droplets toward the plugged fired honeycomb body by a gaseous carrier stream, wherein the gaseous carrier stream comprises a carrier gas and the atomizing gas;

evaporating substantially all of the liquid vehicle from the droplets to form agglomerates comprised of the particles and the binder material; and depositing the agglomerates onto the porous walls of the plugged fired honeycomb body;

wherein the deposited agglomerates are disposed on, or in, or both on and in, the porous walls.

2. The method of claim 1, wherein at least a portion of the carrier gas contacts the atomizing nozzle.

3. The method of claim 1, wherein the binder material tackifies the agglomerates.

4. The method of claim 1, wherein the mixing of the liquid-particulate-binder stream with the atomizing gas occurs inside the atomizing nozzle.

5. The method of claim 1, wherein the mixing of the liquid-particulate-binder stream with the atomizing gas occurs outside the atomizing nozzle.

6. The method of claim 1, wherein the atomizing nozzle is cooled during the atomizing.

7. The method of claim 1, wherein the gaseous carrier stream is heated to a temperature in the range of greater than or equal to 80° C. to less than or equal to 150° C.

8. The method of claim 1, wherein the carrier gas is heated to a temperature in the range of from greater than or equal to 50° C. to less than or equal to 500° C.

9. The method of claim 1, wherein the carrier gas is heated to a temperature in the range of greater than or equal to 80° C. to less than or equal to 150° C.

10. The method of claim 1, wherein the droplets and the gaseous carrier stream are conveyed through a duct having an outlet end proximate the plugged fired honeycomb body.

11. The method of claim 10, wherein the duct is essentially adiabatic.

12. The method of claim 10, wherein the carrier gas is delivered to a chamber of the duct in an annular surrounding the nozzle in a co-flow around the droplets at the end of the nozzle.

13. The method of claim 1, wherein a total volumetric flow through the duct is greater than or equal to 5 $Nm^3$/hour and/or less than or equal to 200 $Nm^3$/hour.

14. The method of claim 1, wherein the depositing of the agglomerates onto the porous walls further comprises passing the gaseous carrier stream through the porous walls of the plugged fired honeycomb body, wherein the walls of the plugged fired honeycomb body filter out at least some of the agglomerates by trapping the filtered agglomerates on or in the walls of the plugged fired honeycomb body.

15. The method of claim 1, wherein heating of the agglomerates causes an inorganic component of the binder material in the deposited agglomerates to form a porous inorganic structure on the porous walls of the plugged fired honeycomb body.

16. The method of claim 1, wherein the carrier gas comprises less than 5 weight percent water vapor.

17. The method of claim 1, further comprising a duct comprising an evaporation section having an axial length configured to allow evaporation of a substantial portion or all of the liquid vehicle from the agglomerates.

18. The method of claim 17, wherein the carrier gas is delivered to a chamber of the duct in an annular surrounding the nozzle in a co-flow around the droplets at the end of the nozzle.

19. A method for forming a fired honeycomb body comprising:

supplying a suspension to an atomizing nozzle that is in fluid communication with a duct comprising an evaporation section, the suspension comprising a mixture including particles of an inorganic material, a binder material, and a liquid vehicle;

supplying a carrier gas to the duct;

contacting the nozzle with the carrier gas;

in the evaporation section, evaporating at least a portion of the liquid vehicle thereby forming agglomerates of the inorganic material;

depositing the agglomerates on porous walls of the fired honeycomb body; and binding the inorganic material to the fired honeycomb body to form a porous inorganic material.

20. The method of claim 19, wherein the carrier gas is at a temperature is in the range of greater than or equal to 80° C. to less than or equal to 150° C.

21. A method for applying an inorganic material to a plugged fired honeycomb body comprising porous walls, the method comprising:

supplying a suspension comprising a mixture including at least particles of the inorganic material and a liquid vehicle to an atomizing nozzle that is in fluid communication with a duct comprising an evaporation section;

atomizing the suspension with an atomizing gas to form droplets comprising the particles of the inorganic material and the liquid vehicle;

supplying a heated carrier gas;

intermixing a gaseous carrier stream including the heated carrier gas with the droplets inside a chamber of the duct to form a mixture;

evaporating at least a portion of the liquid vehicle from the droplets to form agglomerates of the particles of the inorganic material, the agglomerates being interspersed in the gaseous carrier stream;

passing the agglomerates and the gaseous carrier stream into the plugged fired honeycomb body in fluid communication with the duct such that the gaseous carrier stream passes through porous walls of the plugged fired honeycomb body, and the walls of the plugged fired honeycomb body trap the agglomerates, wherein the agglomerates are deposited on or in the porous walls of the plugged fired honeycomb body.

22. The method of claim 21, wherein the heated carrier gas is at a temperature in the range of from greater than or equal to 50° C. to less than or equal to 500° C.

* * * * *